(12) United States Patent
Shimizu

(10) Patent No.: US 7,319,242 B2
(45) Date of Patent: Jan. 15, 2008

(54) SUBSTRATE WITH RECESS PORTION FOR MICROLENS, MICROLENS SUBSTRATE, TRANSMISSIVE SCREEN, REAR TYPE PROJECTOR, AND METHOD OF MANUFACTURING SUBSTRATE WITH RECESS PORTION FOR MICROLENS

(75) Inventor: Nobuo Shimizu, Suwa (JP)

(73) Assignee: Seiko Epson Corporation (JP)

( * ) Notice: Subject to any disclaimer, the term of this patent is extended or adjusted under 35 U.S.C. 154(b) by 40 days.

(21) Appl. No.: 11/013,101

(22) Filed: Dec. 15, 2004

(65) Prior Publication Data

US 2005/0128595 A1   Jun. 16, 2005

(30) Foreign Application Priority Data

Dec. 16, 2003   (JP) .............................. 2003-418654

(51) Int. Cl.
 *H01L 29/22* (2006.01)
(52) U.S. Cl. ......................................... 257/98; 257/294
(58) Field of Classification Search ................ 257/649, 257/650, 88, 91, 97; 438/29, 30, 68; 359/656, 359/626
See application file for complete search history.

(56) References Cited

U.S. PATENT DOCUMENTS

| 5,442,482 | A | 8/1995 | Johnson |
| 6,816,306 | B2 * | 11/2004 | Freese et al. ............... 359/456 |
| 6,909,121 | B2 * | 6/2005 | Nishikawa ................... 257/88 |
| 2005/0078377 | A1 * | 4/2005 | Li et al. ..................... 359/619 |

FOREIGN PATENT DOCUMENTS

| JP | 5-509416 | 12/1993 |
| JP | 2000-155201 | 6/2000 |
| JP | 2002-357869 | 12/2002 |
| JP | 2005-055485 | 3/2005 |

OTHER PUBLICATIONS

Communication from Japanese Patent Office re: related application.

* cited by examiner

*Primary Examiner*—Leonardo Andujar
(74) *Attorney, Agent, or Firm*—Harness, Dickey & Pierce, P.L.C.

(57) ABSTRACT

A microlens substrate is provided having a plurality of first microlenses and a plurality of second microlenses which are located between the plurality of first microlenses. The second microlenses are smaller than the first microlenses.

12 Claims, 15 Drawing Sheets

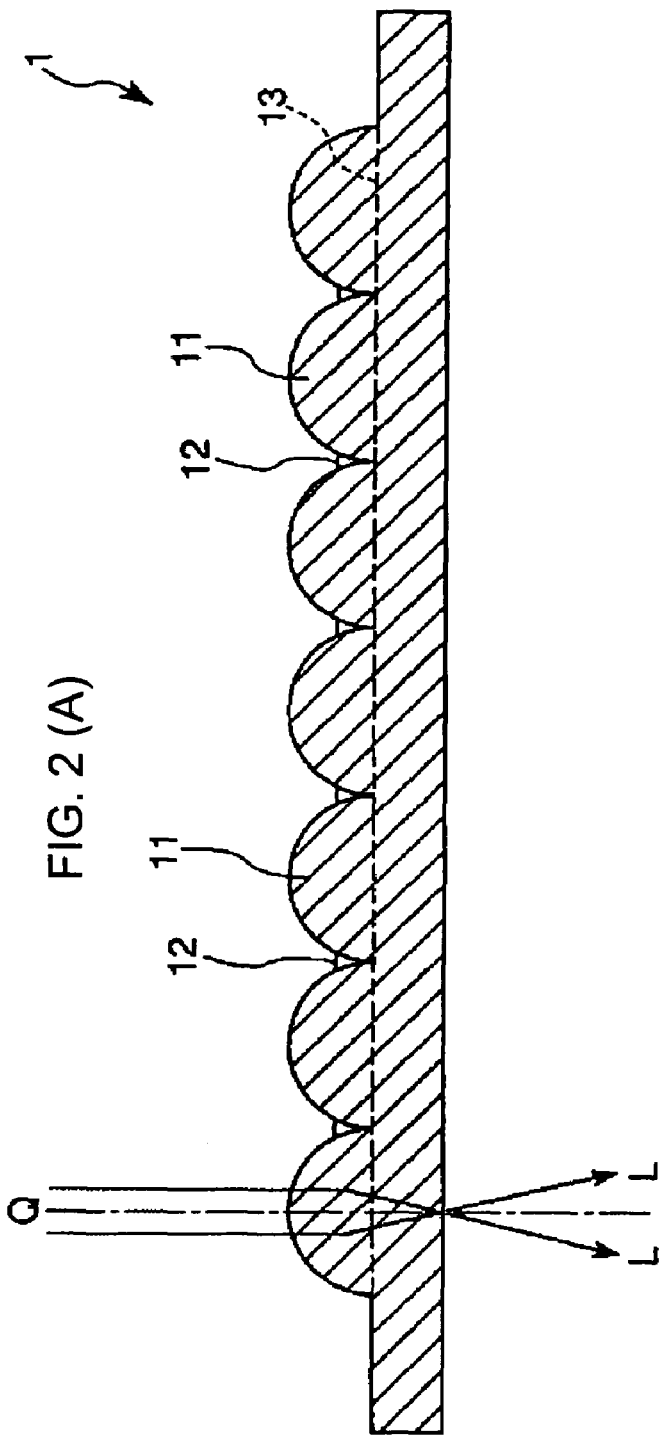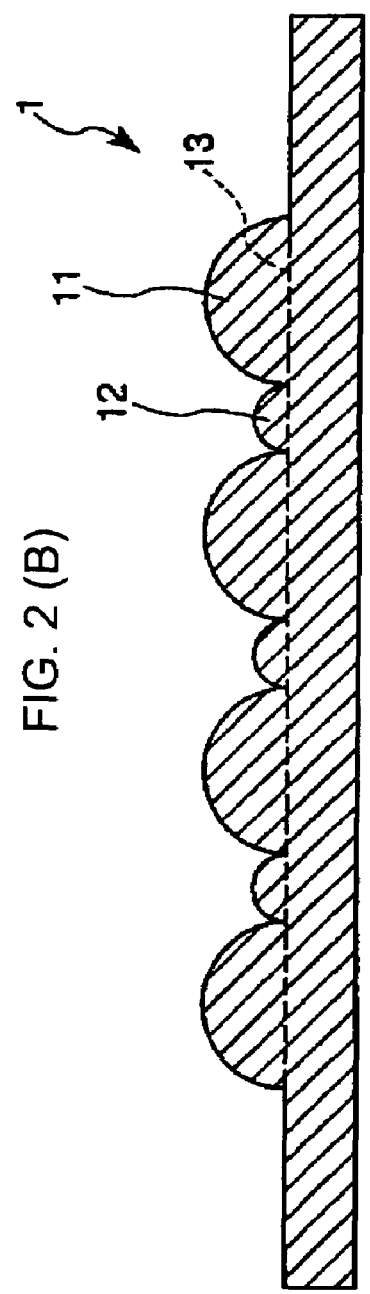

F I G. 9 (A)
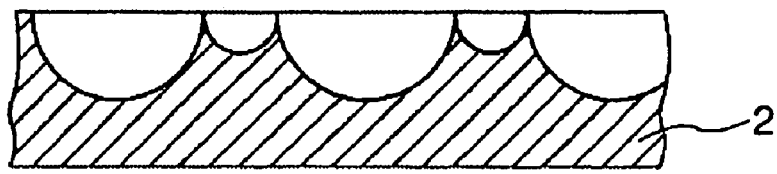
F I G. 9 (B)
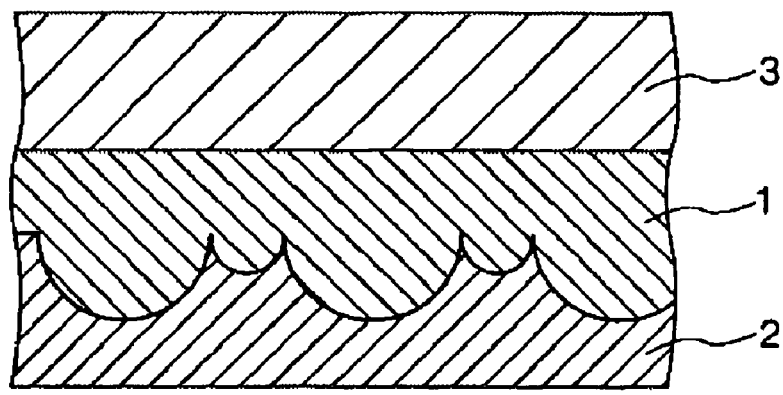
F I G. 9 (C)
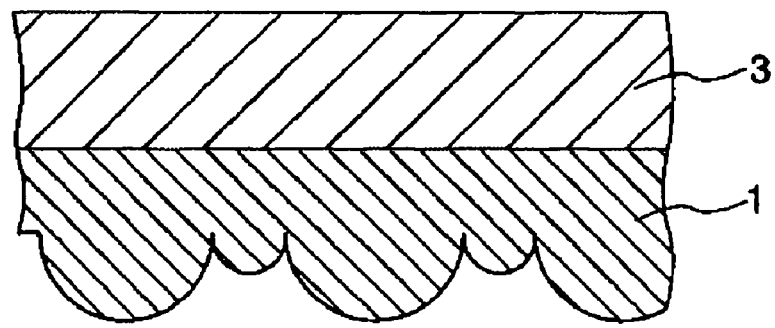

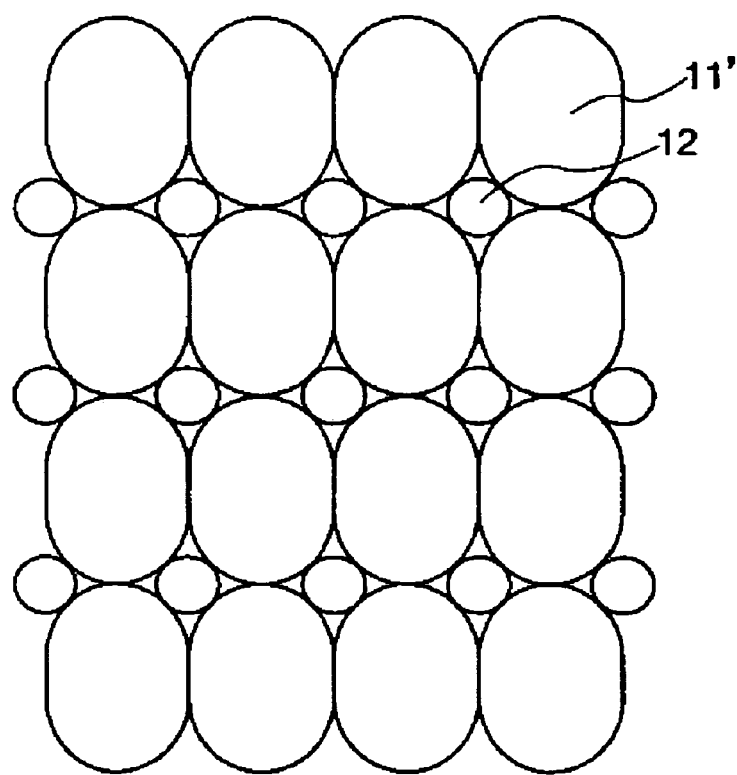
F I G. 1 1 (A)
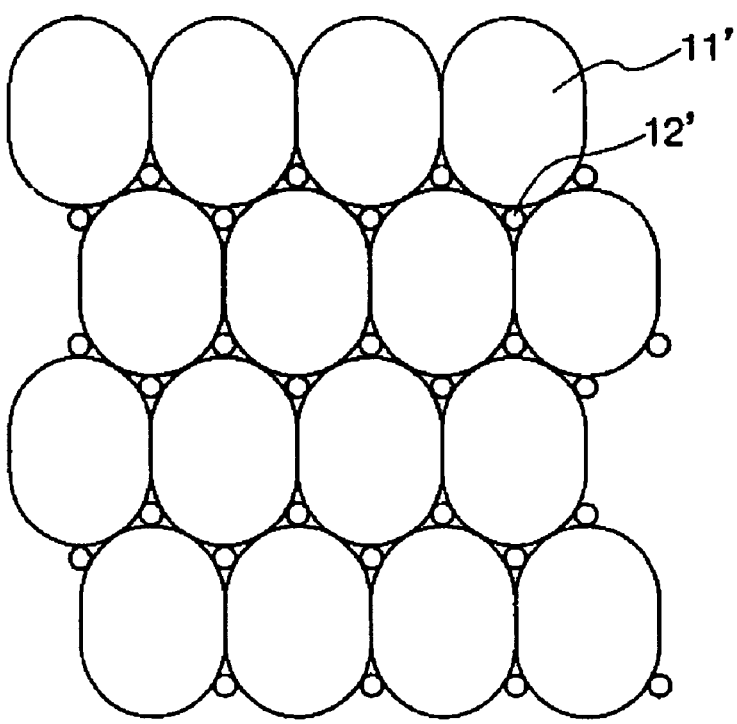
F I G. 1 1 (B)

SUBSTRATE WITH RECESS PORTION FOR MICROLENS, MICROLENS SUBSTRATE, TRANSMISSIVE SCREEN, REAR TYPE PROJECTOR, AND METHOD OF MANUFACTURING SUBSTRATE WITH RECESS PORTION FOR MICROLENS

RELATED APPLICATIONS

This application claims priority to Japanese Patent Application No. 2003-418654 filed Dec. 16, 2003 which is hereby expressly incorporated by reference herein in its entirety.

BACKGROUND

1. Field of the Invention

The present invention relates to a substrate with recess portions for microlenses, a microlens substrate, a transmissive screen, a rear type projector, and a method of manufacturing a substrate with recess portions for microlenses.

2. Description of the Related Art

A display device which projects pictures on a screen is known. As for such display device, a rear type projector applied to a home theater monitor, a big-screen TV, and the like is known.

One known rear type projector includes a lens substrate (microlens substrate) having microlenses. In such a rear type projector, there is an advantage in that the view angle characteristic is improved both in the horizontal direction and in the vertical direction of the screen due to photorefractive effect of the microlenses.

A conventional microlens substrate includes a plurality of microlenses of one size arranged on a substrate. The microlenses have a nearly circular shape or the like and are disposed in a staggered-grid shape or the like (for example, refer to Japanese Unexamined Patent Publication No. H. 5-509416 (FIG. 1)). In such a microlens substrate, a flat portion, where the condensing effect by the microlenses is not obtained, is formed in the relatively large region between the microlenses. This flat portion cannot condense the light irradiated to the microlens substrate, and allows the light to be transmitted as straight-traveling light. As a result, in the rear type projector using such a microlens substrate, a sufficient view angle characteristic is not obtained.

The present invention is intended to provide a substrate with recess portions for microlenses which allows manufacturing a microlens substrate having an excellent view angle characteristic, and to provide the microlens substrate having an excellent view angle characteristic, a transmissive screen, and a rear type projector, and further to provide a method of manufacturing the substrate with the recess portions for the microlenses which allows manufacturing the microlens substrate having an excellent view angle characteristic.

SUMMARY

Such objectives are attained by the present invention as described below.

The substrate with recess portions for microlenses according to the present invention is provided with a plurality of recess portions for forming microlenses, wherein the plurality of recess portions include a plurality of first recess portions and a plurality of second recess portions that are located between the plurality of first recess portions. The second recess portions are smaller than the first recess portions.

Thus, the area of a flat portion is reduced and regions between the first recess portions on the substrate are utilized effectively by the second recess portions. Therefore, a substrate with recess portions for the microlenses which allows manufacturing of a microlens substrate having an excellent view angle characteristic is obtained.

It is preferable that the plurality of first recess portions are arranged in a grid shape or in a nearly grid shape.

Thereby, the first recess portions can be densely formed on the substrate while fully utilizing portions corresponding to an effective lens region of the microlenses in the first recess portions, and the view angle characteristic of the microlens substrate manufactured by the obtained substrate can be made excellent. Moreover, because the first recess portions are located regularly on the substrate, the regions in which the second recess portions should be formed will also be located regularly on the substrate, and the positioning of these second recess portions will be made easily when forming the first recess portions and the second recess portions on the substrate.

It is preferable that the plurality of first recess portions is arranged in a staggered shape or in a nearly staggered shape.

Thereby, the first recess portions can be formed on the substrate even more densely, while still fully utilizing the portions corresponding to the effective lens region of the microlenses in the first recess portions, and the view angle characteristic of the microlens substrate manufactured by the obtained substrate with the recess portions for the microlenses can be made excellent. Moreover, because the first recess portions are located regularly on the substrate, the region in which the second recess portions should be formed will also be located regularly on the substrate, and the positioning of these second recess portions will be made easily when forming the first recess portions and the second recess portions on the substrate.

It is preferable that a periphery of the first recess portions and a periphery of the second recess portions are located on one surface parallel to the substrate.

Because the portions corresponding to the effective lens region of the microlenses in the first recess portions and the second recess portions are formed effectively, the view angle characteristic of the microlens substrate manufactured by the obtained substrate with the recess portions for the microlenses can be made excellent.

In the substrate with the recess portions for the microlenses according to the present invention, it is preferable that each of the first recess portions and the second recess portions is circular or nearly circular.

Thereby, because portions corresponding to the effective lens region of the microlenses in the first recess portions and the second recess portions are formed effectively, the view angle characteristic of the microlens substrate manufactured by the obtained substrate with the recess portions for the microlenses can be made excellent.

In the substrate with the recess portions for the microlenses according to the present invention, it is preferable that the second recess portions are arranged to eliminate the flat portion between the first recess portions.

Thus, while fully utilizing portions corresponding to the effective lens region of the microlenses in the first recess portions and the second recess portions, the first recess portions and the second recess portions will be formed on the substrate by making the best use of the region where the first recess portions and the second recess portions should be formed on the substrate, therefore the view angle characteristic of the microlens substrate manufactured by the obtained substrate with the recess portions for the microlenses can be made excellent.

In the substrate with the recess portions for the microlenses according to the present invention, it is preferable that the periphery (edge) of the first recess portions and the periphery (edge) of the second recess portions contact each other.

Thereby, while fully utilizing the portions corresponding to the effective lens region of the microlenses in the first recess portions and the second recess portions, the first recess portions and the second recess portions will be formed on the substrate by making the best use of the region where the first recess portions and the second recess portions should be formed on the substrate, therefore the view angle characteristic of the microlens substrate manufactured by the obtained substrate with the recess portions for the microlenses can be made excellent.

The substrate with the recess portions for the microlenses according to the present invention, preferably, further comprises third recess portions that are smaller than the second recess portions, wherein the third recess portions are located between the first recess portions except where the second recess portions are formed.

Thereby, because the area of the flat portion between the first recess portions is further reduced by the third recess portions, the view angle characteristic of the microlens substrate manufactured by the obtained substrate with the recess portions for the microlenses can be made excellent.

The microlens substrate according to the present invention is manufactured using the substrate with the recess portions for the microlenses according to the present invention.

Thereby, a microlens substrate having an excellent view angle can be obtained.

The microlens substrate according to the present invention is the microlens substrate where a plurality of microlenses are formed on the substrate, wherein the plurality of microlenses includes a plurality of first microlenses, and a plurality of second microlenses that are located between the plurality of first microlenses and are smaller than the first microlenses.

Thereby, the area of the flat portion is reduced while the region between the first microlenses on the substrate is utilized effectively by the second microlenses, therefore, a microlens substrate having an excellent view angle characteristic can be obtained.

A transmissive screen according to the present invention is provided with the microlens substrate of the present invention.

Thereby, a transmissive screen having an excellent view angle characteristic can be obtained. A rear type projector according to the present invention is provided with the microlens substrate of the present invention.

Thereby, a rear type screen having an excellent view angle characteristic can be obtained.

A method of manufacturing the substrate with the recess portions for the microlenses according to the present invention forms a plurality of recess portions on a substrate for forming microlenses, and comprises: a first recess portions formation step for forming a plurality of first recess portions on the substrate; and a second recess portions formation step for forming, between the first recess portions formed in the first recess portions formation step, a plurality of second recess portions with a size different from the first recess portions.

Thereby, the substrate with the recess portions for the microlenses, which allows manufacturing of the microlens substrate having an excellent view angle characteristic, can be manufactured.

In the method of manufacturing the substrate with the recess portions for the microlenses according to the present invention, it is preferable that the second recess portions are smaller than the first recess portions.

Thereby, the substrate with the recess portions for microlenses, which allows manufacturing of the microlens substrate having an excellent view angle characteristic, can be manufactured.

In the method of manufacturing the substrate with the recess portions for the microlenses according to the present invention, it is preferable that after forming a plurality of openings in a mask formed on the substrate, the first recess portions and the second recess portions are formed on the substrate by etching the substrate.

Thereby, a substrate with the recess portions for the microlenses, which allows manufacturing of the microlens substrate having an excellent view angle characteristic, can be manufactured.

In the method of manufacturing the substrate with the recess portions for the microlenses according to the present invention, it is preferable that after forming a mask on the substrate and forming a plurality of first openings in the mask, the first recess portions are formed in the substrate by etching the substrate, and then, after forming a new mask on the substrate and forming a plurality of second recess portions in the new mask, the second recess portions are formed in the substrate by etching the substrate.

Thereby the substrate with the recess portions for the microlenses, which allows manufacturing of the microlens substrate having an excellent view angle characteristic, can be manufactured.

In the method of manufacturing the substrate with the recess portions with for microlenses according to the present invention, it is preferable that after forming an etchable mask on the substrate in a predetermined thickness and forming a plurality of first openings and second openings that are shallower than the first openings in the mask, the first recess portions and a second recess portions are formed in the substrate by etching the substrate.

Thereby, the substrate with the recess portions for the microlenses, which allows manufacturing of the microlens substrate having an excellent view angle characteristic, can be manufactured. Moreover, a mask formation step and an etching step are only required to be carried out once, respectively, and the manufacturing can be simplified.

The method of manufacturing the substrate with the recess portions for the microlenses according to the present invention forms the recess portions for the microlenses on the substrate, and comprises: forming a plurality of first openings in a mask formed on the substrate; forming a plurality of recess portions on the substrate by carrying out a first etching process to the substrate through the mask after the plurality of first openings are formed; forming a plurality of second openings between the first openings, in the mask formed on the substrate after the first etching process is carried out; and forming, on the substrate, a plurality of second recess portions whose size differs from the first recess portions formed by the first etching process, by carrying out a second etching process to the substrate through the mask after the plurality of second openings are formed.

Thereby, the substrate with the recess portions for the microlenses, which allows manufacturing of the microlens substrate having an excellent view angle characteristic, can be manufactured.

The method of manufacturing a substrate with the recess portions for the microlenses according to the present invention forms the recess portions for the microlenses on the substrate, and comprises: forming a plurality of first and second openings in the mask of a predetermined thickness, the second openings being shallower than the first openings and located between the first openings; and forming two types of recess portions whose sizes differ on the substrate by carrying out etching processing to the substrate through the mask after the plurality of first openings and the plurality of second openings are formed.

Thereby, the substrate with the recess portions for the microlenses, which allows manufacturing of the microlens substrate having an excellent view angle characteristic, can be manufactured. Moreover, the mask formation step and the etching step are only required to be carried out once, respectively, and the manufacturing can be simplified.

BRIEF DESCRIPTION OF THE DRAWINGS

FIG. 2A is the A-A line cross sectional view in FIG. 1, and FIG. 2B is the B-B line cross sectional view in FIG. 1.

FIGS. 9A-9C are schematic vertical cross sectional views showing the method of manufacturing the microlens substrate.

FIG. 11A is a schematic plan view showing the microlens substrate related to one embodiment of the present invention, and FIG. 11B is a schematic plan view showing the microlens substrate related to another embodiment of the present invention.

DETAILED DESCRIPTION

Hereinafter, the present invention will be described in detail based on suitable embodiments shown in the accompanying drawings.

Microlens Substrate

First of all, a microlens substrate according to the present embodiment will be described.

Figure 1:
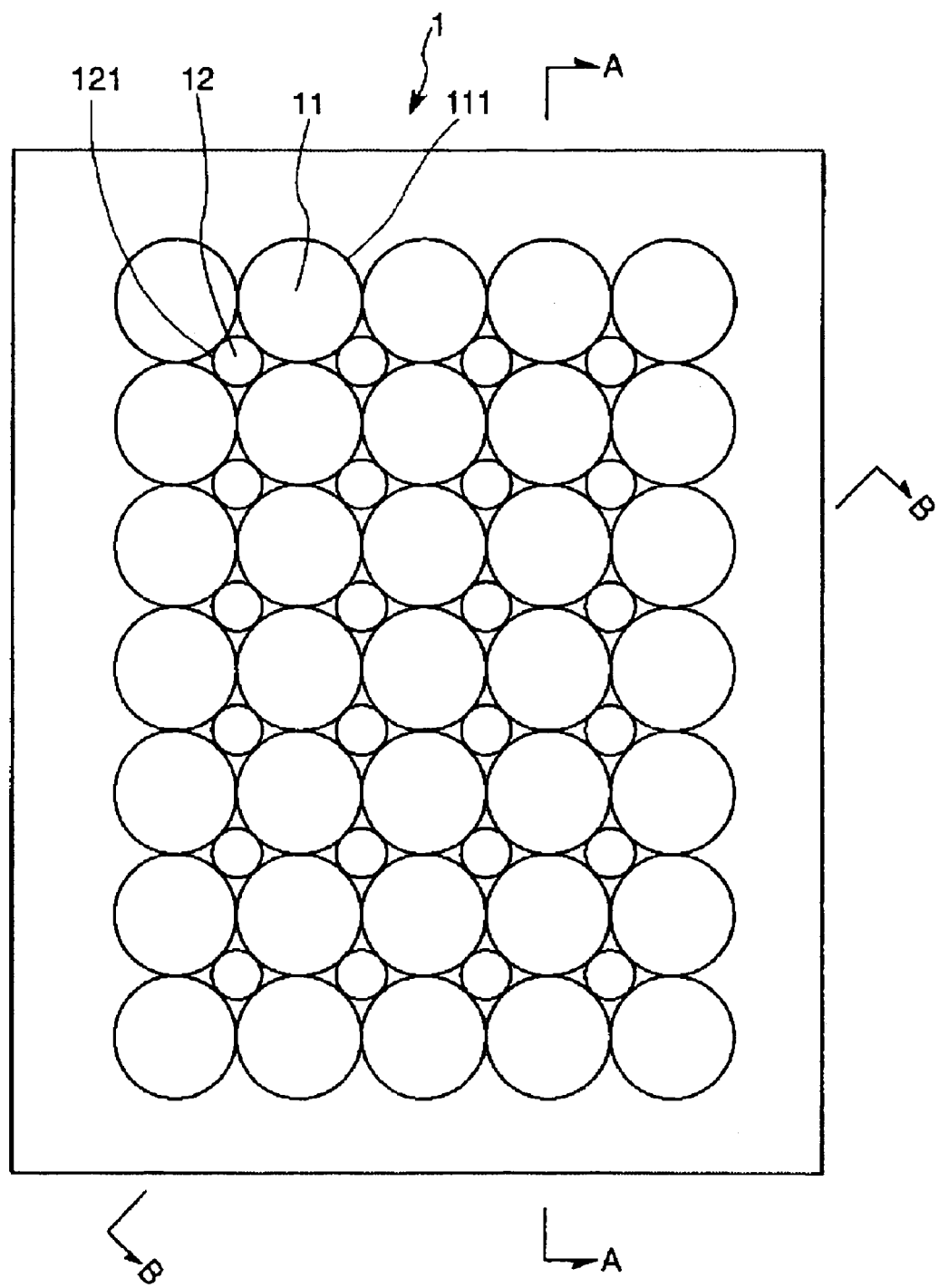
FIG. 1 is a plan view showing the microlens substrate of the present invention.
Figure 3:
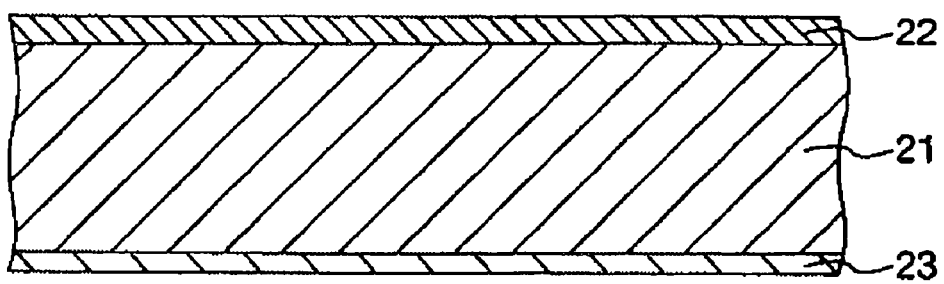
FIGS. 3A and 3B are schematic vertical cross sectional views showing a method of manufacturing a substrate with recess portions for microlenses.
Figure 3:
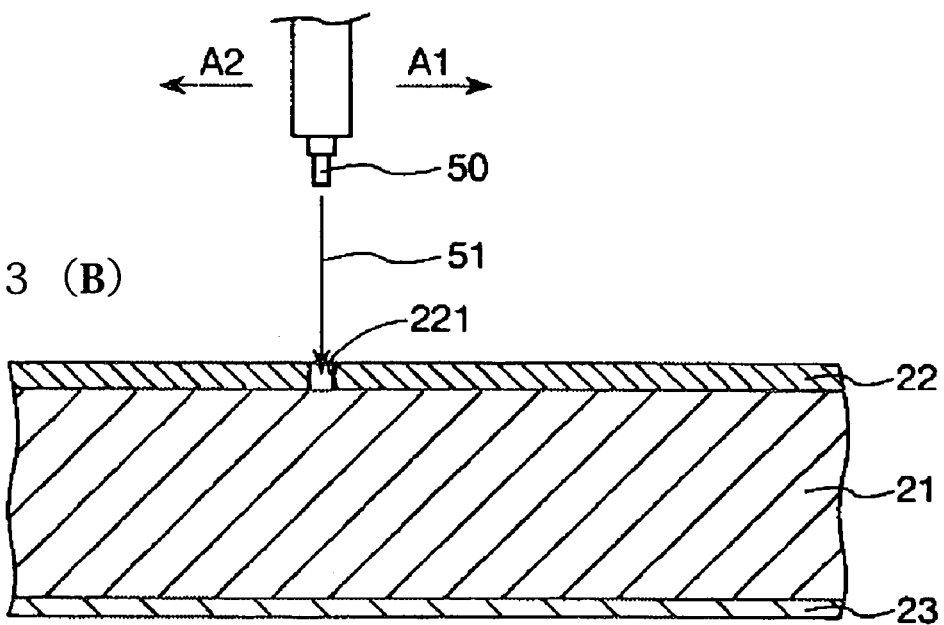
Figure 4:
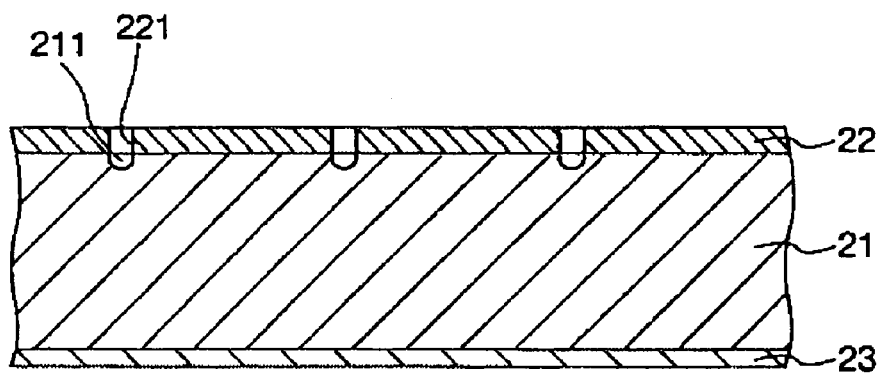
FIGS. 4A and 4B are schematic vertical cross sectional views showing the method of manufacturing the substrate with the recess portions for the microlenses.
Figure 4:
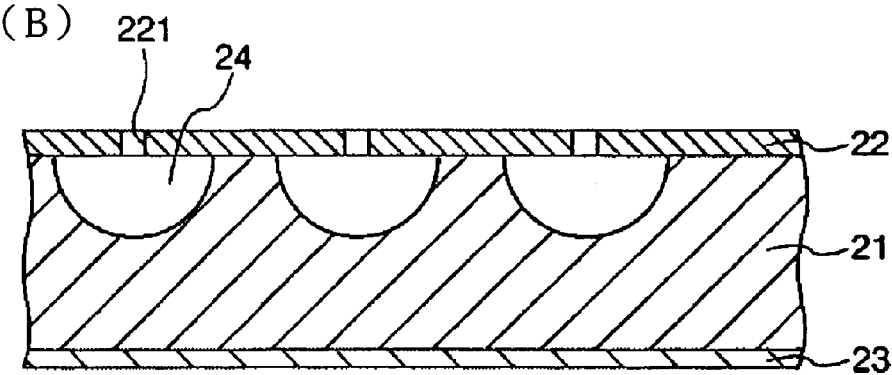
Figure 8:
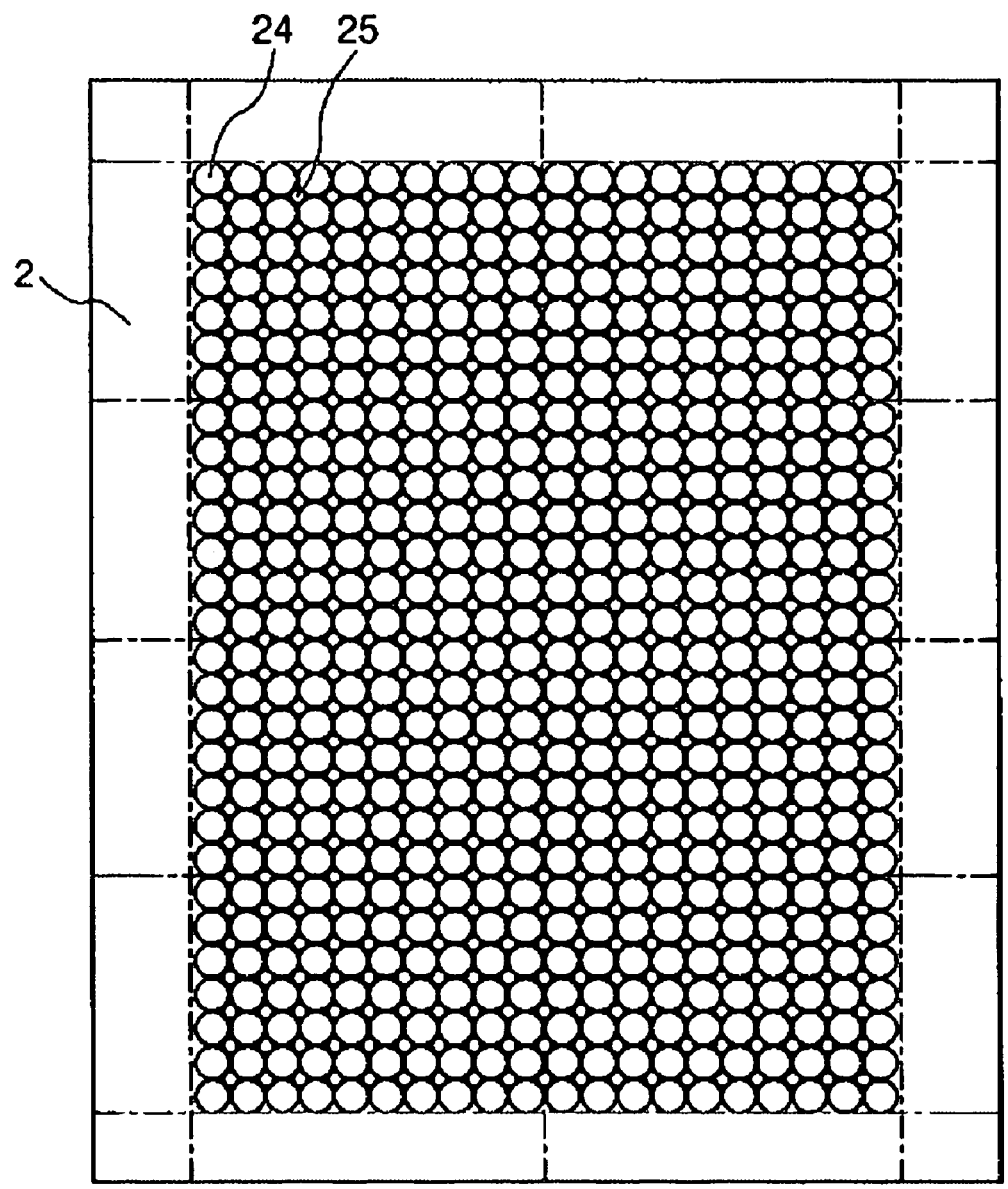
FIG. 8 is a schematic plan view showing the substrate with the recess portions for the microlenses.

FIG. 1 is a schematic plan view showing a microlens substrate of the present invention, FIG. 2A is the A-A line cross sectional view of the microlens substrate shown in FIG. 1, FIG. 2B is the B-B line cross sectional view of the microlens substrate shown in FIG. 1, FIG. 3 through FIG. 7 are schematic vertical cross sectional views showing a method of manufacturing a substrate with recess portions for microlenses, FIG. 8 is a schematic plan view showing a substrate with recess portions for microlenses, and FIG. 9 is a schematic vertical cross sectional view showing a method of manufacturing a microlens substrate of the present invention.

As shown in FIG. 1, a microlens substrate 1 has a plurality of first microlenses 11, and second microlenses 12 that are formed between the first microlenses 11, and are smaller than the first microlenses 11.

In this microlens substrate 1, although each of the first microlenses 11 and the second microlenses 12 are arranged regularly in a grid shape, it is not limited to this, but may be arranged in a nearly grid shape, in a staggered shape, or in a nearly staggered shape, or may be arranged at random. In cases where the microlens substrate 1 is used for, for example, a screen and a rear type projector as will be described later, if each of the first microlenses 11 and the second microlenses 12 is arranged at random, the occurrence of interference patterns, such as the so-called moire, can be prevented more effectively.

In the microlens substrate 1 of the present invention, the second microlenses 12 are smaller than the first microlenses 11 and are formed between the first microlenses 11.

Thereby, the region formed between the first microlenses 11 on the microlens substrate 1 is utilized effectively by the second microlenses 12, and while the straight-traveling light is suppressed by the reduction of the area of the flat portion (portion without condensing effect) in the region, the condensing effect by the second microlenses 12 is also obtained in the region. As a result, the microlens substrate 1 has an excellent view angle characteristic.

Moreover, in the microlens substrate 1, as shown in FIG. 2, both of a periphery 111 of the first microlenses 11 and a periphery 121 of the second microlenses 12 are located on a surface 13 (one surface parallel to the microlens substrate 1) of the microlens substrate 1. Namely, each periphery side portion (a portion with a relatively large angle to the surface 13) of the first microlenses 11 and the second microlenses 12 is formed to not overlap each other and to not damage each condensing effect.

Thereby, because each effective lens region of the first microlenses 11 and the second microlenses 12 can be fully utilized and especially the periphery side portions having a high condensing effect can be utilized, the microlens substrate 1 will have a more excellent view angle characteristic.

Moreover, in case that the first microlenses 11 are spherical lenses, the first microlenses 11 can be made hemispherical by making the height (height in the direction perpendicular to the surface 13 in the effective lens region) of the first microlenses 11 substantially equal to the curvature radius. Thereby, because the effective lens region of the first microlenses 11 can be fully utilized and especially the periphery side portion having a high condensing effect can be utilized, the microlens substrate 1 will have a more excellent view angle characteristic. The second microlenses 12 can also be made hemispherical in the same way. Thereby, because the effective lens region of the second microlenses 12 can be fully utilized and especially the periphery side portion having a high condensing effect can be utilized, the microlens substrate 1 will have a more excellent view angle characteristic.

Furthermore, in the microlens substrate 1, as shown in FIG. 2A, the peripheries of the first microlenses 11 contact each other, and as shown in FIG. 2B, the periphery of the first microlenses 11 and the periphery of the second microlenses 12 contact.

Thereby, while fully utilizing these effective lens regions without damaging the condensing effect of the periphery side portions of the first microlenses 11 and the second microlenses 12, the region formed between the first microlenses 11 on the microlens substrate 1 is fully utilized by the second microlenses 12. As a result, the obtained microlens substrate 1 has a more excellent view angle characteristic. In addition, the peripheries of the first microlenses 11 may not need to contact each other.

Preferably, the pitch between adjoining first microlenses 11 is 10 through 500 µm, more preferably 30 through 300 µm, and even more preferably 50 through 200 µm.

Preferably, the diameter of the first microlenses 11 is 10 through 500 µm, more preferably 30 through 80 µm, and even more preferably 50 through 60 µm. If the diameter of the first microlenses 11 is within the above limits, the productivity of the transmissive screen can be increased further, while maintaining sufficient resolution in pictures projected to a screen.

Preferably, the diameter of the second microlenses 12 is 1 through 200 µm, more preferably 5 through 50 µm, and even more preferably 10 through 30 µm. If the diameter of the second microlenses 12 is within the above limits, the ratio (filling factor) of the area which the first microlenses 11 and the second microlenses 12 occupy with respect to the area of the region in which the first microlenses 11 and the second microlenses 12 should be formed in the microlens substrates 1, can be made high. As a result, the view angle characteristic of the microlens substrate 1 can be especially excellent.

Moreover, the ratio of the areas is made preferably 0.90 through 0.99, and more preferably 0.92 through 0.99. Thereby, the straight-traveling light is fully suppressed due to the reduction of the area of a flat portion (portion without the condensing effect) in the region, and the view angle characteristic of the microlens substrate 1 can be made excellent. If the ratio of the area is below the upper limit, for example, the view angle characteristic may not be fully obtained, depending on the type of the rear type projector provided with the microlens substrate 1, due to the straight-traveling light from the flat portion between the first microlenses 11. On the other hand, if the ratio of the area exceeds the lower-limit value, manufacturing of the first microlenses and the second microlenses will be difficult depending on the material which constitutes the microlens substrate.

In order to improve the ratio of the above-described areas, third microlenses may be further formed on the substrate, in addition to the second microlenses 12, between the first microlenses 11. Thereby, because the area of the flat portion between the first microlenses is further reduced by the third microlenses, the straight-traveling light from the flat portion is reduced, and in the obtained microlens substrate, the view angle characteristic will be further improved. Moreover, the area of the flat portion may be reduced by forming, like the third microlenses, fourth and fifth lenses and so on between the first microlenses 11.

Moreover, the ratio of the diameter of the second microlenses to the diameter of the first microlenses is preferably 0.1 through 0.5, and more preferably 0.15 through 0.4. Thereby, while the space between the periphery of the first microlenses and the periphery of the second microlenses is made small, and especially while having these peripheries contact each other, the first microlenses can be arranged densely in a grid shape or in a substantially staggered shape. Namely, while fully utilizing these effective lens regions without damaging the condensing effect of the periphery side portion of the first microlenses 11 and the second microlenses 12, the area of the flat portion of the region formed between the first microlenses 11 on the microlens substrate 1 is reduced. As a result, the obtained microlens substrate 1 has a more excellent view angle characteristic.

Moreover, in the above description, although the microlens substrate 1 is provided with plano-convex lenses (plano-convex microlenses) where the microlenses are formed only in one surface, the microlens substrate of the present invention is not limited to this.

For example, the microlens substrate may be provided with biconvex lenses wherein the microlenses are formed in two surfaces. In this case, the microlens substrate provided with the biconvex lenses may be obtained by bonding the above-described plano-convex lenses to each other along the plane side.

Method of Manufacturing Substrate with Recess Portions for Microlenses

Next, a method of manufacturing a substrate with recess portions for microlenses (substrate with recess portions) used for manufacturing of the microlens substrate of the present invention will be described with reference to FIG. 3 through FIG. 7.

In addition, FIG. 3 through FIG. 7 show the cross section corresponding to the B-B line cross sectional view of FIG. 1. Moreover, in the description below, a method of forming the desired (desired shape and size) recess portions for the microlenses (recess portions for microlenses) by forming initial holes in the mask formed on the substrate surface by a physical method or laser beam irradiation and then carrying out etching, is cited as an example and will be described, however, the method of manufacturing the substrate with the recess portions for the microlenses is not limited to this, and, for example, any one such as a method of forming the recess portions for the lenses by forming opening portions in the mask formed on the substrate surface by photolithography or the like, and carrying out etching, may be used.

In this embodiment, at first, the initial holes for the first recess portions are formed in the mask formed on the substrate surface by a physical method or laser beam irradiation, and then desired (desired shape and size) first recess portions for the microlenses (first recess portions) are formed by carrying out etching. Then, second recess portions will be formed in the substrate near where the first recess portions are formed in the same way as the formation of the first recess portions. In addition, actually, a plurality of recess portions for the microlenses are formed on the substrate, however, here in order to make the description easy to understand, a part of them will be shown in the figure and described.

First, a substrate 21 is prepared in order to manufacture a substrate 2 with recess portions for microlenses.

A substrate 21 having uniform thickness and no deformation or no defects is preferably used. Moreover, the surface of the substrate 21 is preferably cleaned by cleansing or the like.

As the material of the substrate 21, non-alkali glass, soda glass, crystalline glass, silica glass, lead glass, potassium glass, borosilicate glass, and the like are cited, however, non-alkali glass and crystalline glass (for example, Neoceram or the like) are preferable among them. Non-alkali glass and crystalline glass are easy to process, and at the same time relatively inexpensive, and also are advantageous in terms of the manufacturing cost.

The thickness of the substrate 21 varies according to various conditions, such as the material constituting the substrate 21 and the refractive index, however approximately 0.3 through 3 mm is usually preferable, and approximately 0.5 through 2 mm is more preferable. If the thickness is made within these limits, a compact substrate 2 with recess portions for microlenses having a desired optical characteristic can be obtained.

<1> a mask 22 is formed on the surface of the prepared substrate 21 as shown in FIG. 3A (first mask formation step). Moreover, a rear surface protection layer 23 is formed on the rear surface (opposite side surface of the surface where the mask 22 is formed) of the substrate 21. Of course, the mask 22 and the rear surface protection layer 23 can also be formed simultaneously.

As the mask 22, it is preferable that first initial holes 221 can be formed by a physical method or laser beam irradiation in step <2> to be hereinafter described and at the same time, a mask having a resistance characteristic against etching in step <3> to be hereinafter described is preferable. In other words, it is preferable that the mask 22 be constituted such that the etching rate is nearly equal to that of the substrate 21 or less than that of the substrate 21.

From such a viewpoint, as the material constituting the mask 22, for example, metal such as Cr, au, Ni, Ti, Pt, an alloy containing two types or more selected from these, an oxide of the metal (metal oxide), silicon, and resin, are cited. Moreover, the mask 22 may be made in a multilayered structure of a plurality of layers made of different materials such as Cr/au.

Although the formation method of the mask 22 is not limited in particular, in case that the mask 22 is constituted by metal material (including alloy) such as Cr and au, or the metal oxide (for example, Cr-oxide), the mask 22 can be suitably formed, for example, by a vapor-deposition method, a sputtering method, or the like. Moreover, in case that the mask 22 is constituted by silicon, the mask 22 can be suitably formed, for example, by a sputtering method, a CVD method, or the like.

If the mask 22 is constituted substantially of Cr-oxide or Cr, the first initial holes 221 can be formed easily in the first initial holes formation step to be hereinafter described and at the same time, the substrate 21 can be protected more securely in the first etching step to be hereinafter described. Moreover, if the mask 22 is constituted substantially of Cr, for example, a solution of monohydric difluoride ammonium can be used as the etchant in the first initial holes formation step, which will be described later. Because monohydric difluoride ammonium is not a poisonous material in a concentration of 4 wt % or less, influence to human bodies at work and to the environment can be prevented more securely.

If the mask 22 is constituted substantially of au, for example, in case that the formation of the first initial holes 221 is carried out by shot blast processing in step <2> to be hereinafter described, the impact at the time of collision of projecting material (shot ball) can be reduced by making the layer thickness of the mask 22 relatively large, and the shape of the first initial holes 221 to be formed can be made more excellently balanced.

Moreover, for example, in case that the mask 22 is constituted by material etchable at a predetermined etching rate in step <3> to be hereinafter described and the mask 22 is formed relatively thick, the openings not only for the first initial holes but also for the second recess portions formation are formed more shallow than the first initial holes in step <2> to be hereinafter described and thereby, then, the first recess portions and the second recess portions can be formed on the substrate in step <3>, which will be described later. In this case, the mask is etched in the openings of step <3> to be hereinafter described and thereby, these will be formed on the substrate, in order of the first recess portions and the second recess portions, with a time lag. Thereby, step <4> to be hereinafter described and steps <B1> through <B3> in step <5> to be hereinafter described will be unnecessary, and the manufacturing is simplified.

Although the thickness of the mask 22 differs also depending on the material constituting the mask 22, approximately 0.05 through 2.0 µm is preferable, and approximately 0.1 through 0.5 µm is more preferable. If the thickness is below the lower limit value, in case that the formation of the first initial holes 221 in step <2> to be hereinafter described is carried out by shot blast processing, it is difficult to fully reduce the impact of the shot depending on the material which constitutes the mask 22, and there is a possibility that the shape of the first initial holes 221 to be formed is distorted. Moreover, when carrying out wet etching in step <3> to be hereinafter described, there is a possibility that the masked portion of the substrate 21 cannot be sufficiently protected. On the other hand, if exceeding the upper limit value, it is difficult to form the first initial holes 221 by a physical method or laser beam irradiation, and in addition, there may be cases where the mask 22 may peel off easily by the internal stress of the mask 22 depending on the composition material of the mask 22 or the like.

In addition, the rear face protection layer 23 is for protecting the rear face of the substrate 21 in the next step and thereafter.

Erosion, degradation and the like of the rear surface of the substrate 21 are suitably prevented by the rear surface protection layer 23. The rear surface protection layer 23 is, for example, constituted by the same material as the mask 22. For this reason, the rear surface protection layer 23 can be provided simultaneously with the formation of the mask 22, and in the same way as the mask 22.

<2> Next, as shown in FIG. 3B and FIG. 4A, a plurality of first initial holes 221, which become the mask openings for the formation of the first recess portions 24 at the time of etching in step <3> to be hereinafter described are formed in the mask 22 by a physical method or laser beam irradiation (first initial holes formation step).

In case that the first initial holes 221 are formed by laser beam irradiation, the type of the laser beam to be used is not limited in particular, however, a ruby laser, a semiconductor laser, YAG laser, a femtosecond laser, a glass laser, $YVO_4$ laser, Ne—He laser, Ar laser, $CO_2$ laser, and the like are cited. In case that the first initial holes 221 are formed by laser beam irradiation, the size of the first initial holes 221 to be formed, and the space between the adjoining first initial holes 221 or the like can be controlled easily and precisely.

Moreover, as the physical method for forming the first initial holes 221, for example, methods such as, blast processing such as shot blast and sandblast, press, a dot printer, tapping, and rubbing, are cited. In case that the first initial holes 221 are formed by blast processing, even in the substrate 21 having a relatively large area (area of the region where the first microlenses 11 and the second microlenses 12 should be formed), the first initial holes 221 can be formed efficiently in a shorter time.

Here, in particular, a case where the first initial holes 221 are formed in the mask 22 by laser beam irradiation is cited as an example and will be described.

In case that the first initial holes 221 are formed in the mask 22 by the laser beam irradiation, the first initial holes 221 are formed, as shown in FIG. 3B, in the mask 22 by irradiating a laser beam 51 towards the surface of the mask 22 from a laser 50 that is arranged perpendicularly to the surface, at the side opposing the surface where the mask 22 of the substrate 21 is formed. A plurality of first initial holes 221 are formed over the entire surface of the mask 22 by carrying out the laser beam 51 irradiation intermittently over the entire surface of the mask 22, while displacing the laser 50, as shown by the arrows A1 and A2 in the view.

In this example, the plurality of first initial holes 221 are located in a grid shape over the entire surface of the mask 22. Thereby, because the space of the adjoining first initial holes 221 will be equal with respect to all the initial holes 221, the etching amount of the substrate 21 by etching in step <3> to be hereinafter described can be easily controlled to a desired amount.

In addition, the position of the first initial holes 221 is not limited to the above described grid shape, but may be in a staggered shape or may be at random, and can be selected suitably according to the configuration of the microlens substrate or the substrate with the recess portions for the microlenses to be obtained.

The first initial holes 221 are formed in the mask 22 as shown in FIG. 3B by irradiating the laser beam 51 to the mask 22 this way.

It is preferable that the formed first initial holes 221 are formed without an offset over the entire surface of the mask 22. Moreover, as for the formed first initial holes 221, when carrying out the wet etching in step <3> to be hereinafter described, it is preferable that small holes are arranged with a certain amount of space, to the degree that the flat surface of the substrate 21 becomes small and the peripheries of the first recess portions 24 contact each other.

Specifically, for example, the shape, seen two-dimensionally, of the formed first initial holes 221 is nearly circular, and preferably the average diameter thereof (diameter) is 2 through 10 μm. Moreover, it is preferable that the first initial holes 221 are formed at a ratio of 1,000 through 1,000,000 pieces/cm² on the mask 22, and more preferably formed at the ratio of 10,000 through 500,000 pieces/cm². In addition, the shape of the first initial holes 221 is not limited to circular or nearly circular, but may be elliptical or nearly elliptical, and further may be a shape like a straw bag.

Moreover, when forming the first initial holes 221 in the mask 22, as shown in FIG. 4A, the initial recess portions 211 may be formed by removing not only the mask 22 but a part of the surface of the substrate 21 simultaneously. Thereby, when carrying out etching in step <3> to be hereinafter described, the contact area to the etchant becomes large, and the erosion can be started suitably. Moreover, by the adjustment of the depth of the initial recess portions 211, the depth (maximum thickness of lenses) of the first recess portions 24 can also be adjusted.

The depth of the initial recess portions 211 is not limited in particular, however it is preferable to set it to 5 μm or less, and more preferable to set to approximately 0.1 through 0.5 μm.

In the above description, the method of forming the first initial holes 221 by laser beam irradiation is described, however as previously described, the first initial holes 221 may be formed by methods other than laser beam irradiation (for example, methods, such as blast processing such as shot blast, press, a dot printer, tapping, and rubbing).

In case that the first initial holes 221 are formed by the shot blast, steel grid, brown alumina, white alumina, glass bead, stainless steel bead, garnet, silica sand, plastic, cut wire, slag, or the like are cited as the projecting material. Among them, the glass bead is preferable in particular. Thereby, the first initial holes 221 can be suitably formed in the mask 22.

The average diameter (diameter) of such projecting material is preferably 20 through 200 μm, and more preferably 50 through 100 μm. If the average diameter of the projecting material is below the lower limit value, it is difficult to form the initial holes efficiently, and there may be cases where the projecting material adheres to each other and a lump with a size exceeding the upper limit value is formed. On the other hand, if the average diameter of the projecting material exceeds the upper limit value, the initial holes to be formed will become too large, or the initial holes will be coupled, and initial holes with abnormal shapes will be formed easily.

The injection pressure of the projecting material is preferably 1 through 10 kg/cm² and more preferably 3 through 5 kg/cm². If the injection pressure of the projecting material is below the lower limit value, the impact of the shot becomes weak, and there may be cases where it is difficult to securely form the first initial holes 221 in the mask 22. On the other hand, if the injection pressure of the projecting material exceeds the upper limit value, there is a possibility that the impact of the shot is too strong and may crush the projecting material or distort the shape of the first initial holes 221 by the impact.

Moreover, the injection density of the projecting material is preferably 10 through 100 kg/m², and more preferably 30 through 50 kg/m². If the injection density of the projecting material is below the lower limit value, the shot count decreases, and it takes too long to form the first initial holes 221 without an offset over the entire surface of the mask 22. On the other hand, if the injection density of the projecting material exceeds the upper limit value, the first initial holes 221 will be overlapped, and it is likely that the initial holes are coupled to make a large hole, or the initial holes with abnormal shapes are formed easily.

In case that the first initial holes 221 are formed by pressing, the first initial holes 221 can be formed, for example, by pressing a roller against the mask 22 whose protruding portions are formed in a predetermined pattern, and by rolling on the mask 22.

Moreover, the first initial holes 221 are formed to the formed mask 22 not only by a physical method or laser beam irradiation, but, for example, when forming the mask 22 on the substrate 21, foreign substances may be arranged in a predetermined pattern on the substrate 21 in advance, the mask 22 is then formed thereon, and thereby defects may be actively formed in the mask 22 to make the defects the first initial holes 221.

In the present invention, although the manufacturing method of the substrate with recess portions is not limited in particular, the opening portions (first initial holes 221) of a predetermined shape can be formed in the mask 22 more simply and inexpensively by forming the initial holes in the mask by the above described physical method or laser beam irradiation. Moreover, by the physical method or the laser beam irradiation, the processing to a large substrate can also be carried out easily.

Moreover, the arrangement of the formed first initial holes 221 is not limited in particular, but may be in a regular pattern or may be in a random pattern, however, in case that the obtained substrate with recess portions (substrate with the recess portions for the microlenses) is used for the manufacturing of a screen and a rear type projector to be hereinafter described, if a random pattern is employed, the occurrence of an interference pattern, for example, such as the so-called moire, can be prevented more effectively.

<3> Next, as shown in FIG. 4B, a plurality of first recess portions 24 are formed on the substrate 21 by carrying out etching to the substrate 21 where the mask 22 is provided (first etching step). In this case, the size of the first recess portions 24 is made the size corresponding to the size of the above described first microlenses 11. Namely, when the microlens substrate 1 is manufactured by the obtained substrate 2 with the recess portions for the microlenses, the size of the first recess portions 24 is set so that the first microlenses 11 may be the desired size as described above.

The method of etching is not limited in particular, and for example, wet etching, dry etching and the like are cited. In the following description, the case where wet etching is used is cited as an example and will be described.

By carrying out etching (wet etching) to the substrate 21 covered with the mask 22 where the first initial holes 221 are formed, the substrate 21 is etched from the portion 221 in which the mask 22 does not exist, i.e., the first initial holes 221, as shown in FIG. 4B, and a plurality of first recess portions 24 are formed in the substrate 21.

Moreover, in this embodiment, when the first initial holes 221 are formed in the mask 22 in step <2>, the initial recess portions 211 are formed in the substrate 21 surface. Thereby, when carrying out etching, the contact area to the etchant becomes large, and the erosion can be started suitably.

Moreover, if the wet etching method is used, the first recess portions 24 can be formed suitably. Then, as the etchant, for example, if the etchant (hydrofluoric-acid system etchant) containing hydrofluoric acid or fluoride ion is used, the substrate 21 can be etched more selectively and the first recess portions 24 can be formed suitably.

If the mask 22 is the one constituted substantially of Cr, a monohydric difuluoride ammonium solution is suitable as the hydrofluoric-acid etchant, in particular. Because the concentration is 4 wt % or less, monohydric difluoride ammonium is not a poisonous material, and the influence to human bodies at work and to the environment can be prevented more securely.

Moreover, by wet etching, the processing can be carried out with a simple device as compared with dry etching, and further, the processing can be carried out to a plurality of substrates at one time. Accordingly, the productivity can be improved and the substrate 2 with the recess portions for the microlenses can be provided inexpensively. As a result, the productivity of the microlens substrate, the transmissive screen, the rear type projector and the like can also be improved, and further reduction of the production cost can be attained.

Figure 5:
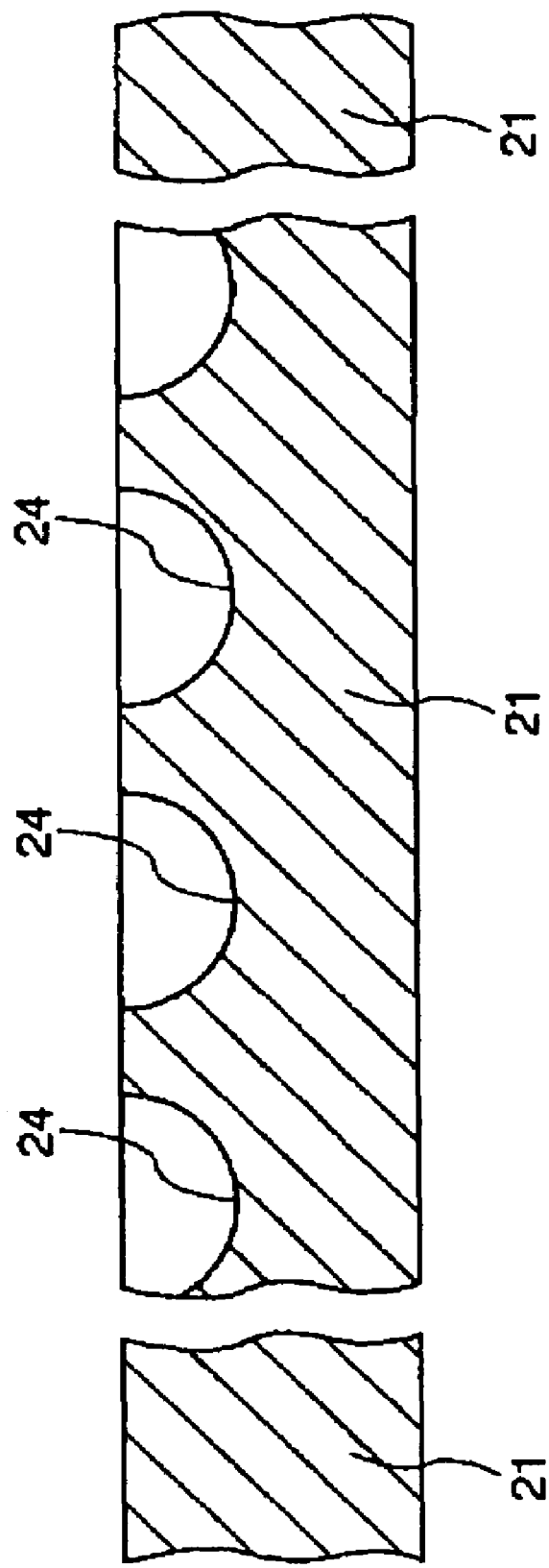
FIG. 5 is a schematic vertical cross sectional view showing the method of manufacturing the substrate with the recess portions for the microlenses.
Figure 6:
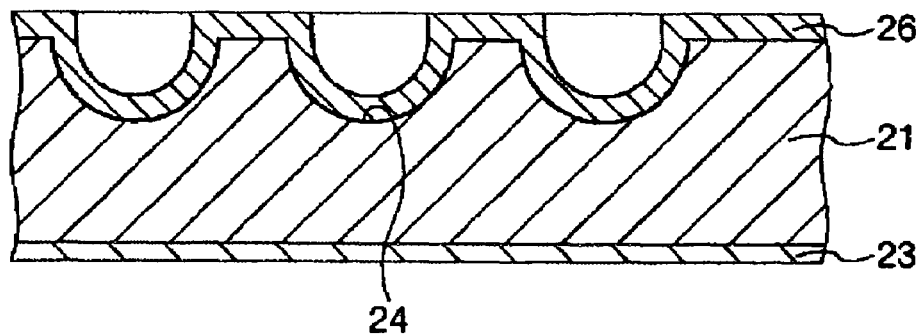
FIGS. 6A and 6B are schematic vertical cross sectional views showing the method of manufacturing the substrate with the recess portions for the microlenses.
Figure 6:
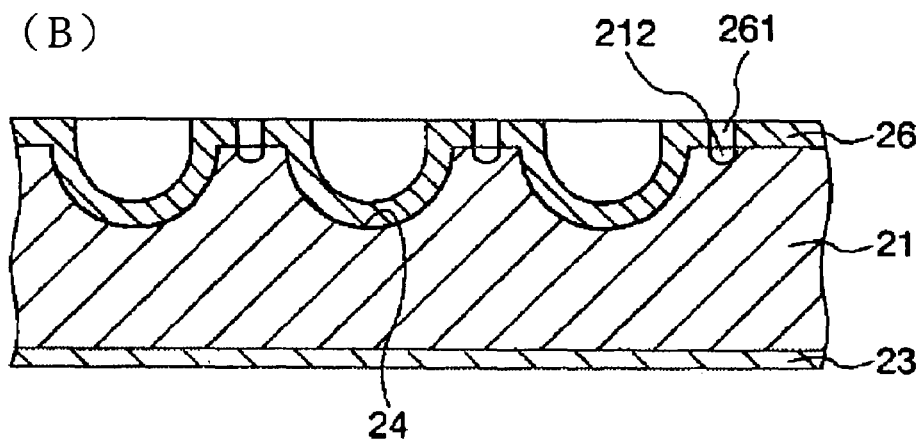
Figure 7:
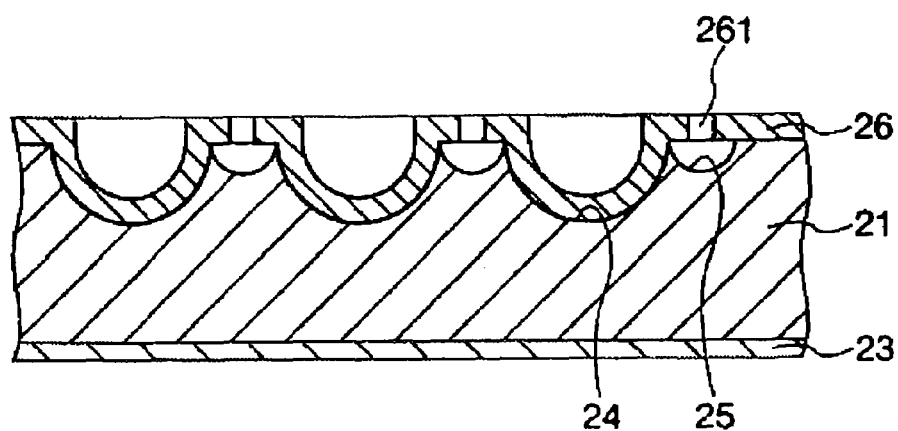
FIGS. 7A and 7B are schematic vertical cross sectional views showing the method of manufacturing the substrate with the recess portions for the microlenses.
Figure 7:
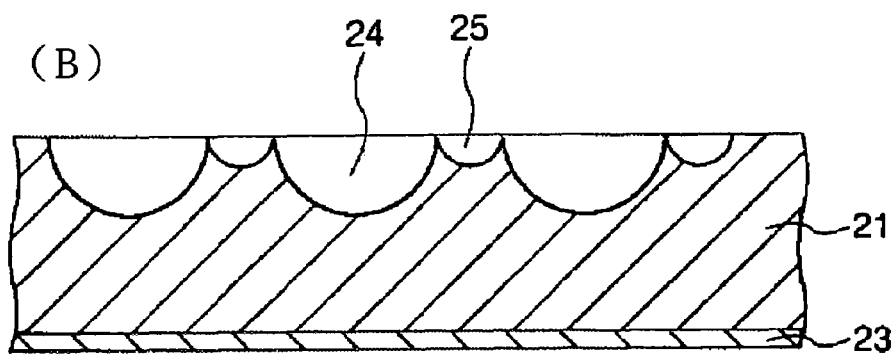

<4> Next, as shown in FIG. 5, the mask 22 is removed (first mask removal step).

In case that the mask 22 is constituted substantially of Cr, the removal of the mask 22 can be carried out, for example, by etching using a mixture containing cerium ammonium nitrate and perchloric acid.

<5> Furthermore, after removing the mask 22 in step <4>, a new mask 26 is formed on the substrate 21, and a series of steps of mask formation, initial holes formation, wet etching, and mask removal will be carried out repeatedly. Hereinafter, a specific example will be described.

<B1> First, as shown in FIG. 6A, a new mask 26 is formed on the substrate 21 in which the first recess portions 24 are formed. The mask 26 can be formed in the same way as the mask 22 described earlier (second mask formation step).

<B2> Next, as shown in FIG. 6B, second initial holes 261 are formed in the mask 26 between the location where the first initial holes 221 where placed, for example, in the intermediate position, by a physical method or laser beam irradiation as described above (second initial holes formation step). At this time, initial recess portions 212 may be formed in the surface of the substrate 21.

<B3> Then, the same etching as the above is carried out to the substrate 21 through the mask 26 as shown in FIG. 7A, and a second recess portions 25 are formed (second etching step). In this case, for example, the concentration of the etchant, the processing time of etching, and the like are adjusted so that, for example, the second recess portions 25 may be smaller than the first recess portions 24. Moreover, the size of the second recess portions 25 is set to the size corresponding to the size of the second microlenses 12 described above. Namely, the size of the second recess portions 25 is set so that the second microlenses 12 may be a desired size as described above when the microlens substrate 1 is manufactured by the obtained substrate 2 with the recess portions for the microlenses.

<B4> Finally, as shown in FIG. 7B, the mask 26 is removed from the substrate 21 (second mask removal step). In this case, the rear surface protection layer 23 may also be removed from the substrate 21.

The steps <B1> through <B4> can be carried out, respectively, by the same method as steps <1> through <4> described above.

Thus, by repeating a series of steps twice, the first recess portions 24 and the second recess portions 25 can be formed without an offset over the entire surface of the substrate 21, while the shape of each of the first recess portions 24 and the second recess portions 25 can be made the same and uniform.

Moreover, by changing the condition in each step according to the first and the second, the shape (size, depth, curvature, recess portion shape, and the like) of the formed first recess portions 24 and second recess portions 25 can be adjusted to make a desired shape.

For example, by changing the conditions, such as the diameter and the intensity of the laser beam 51, the processing time, and the like in the first initial holes formation step, the size of the first initial holes 221 formed in the mask 22, and the size, the depth, and the like of the initial recess portions 211 formed in the substrate 21 can be adjusted.

Moreover, instead of carrying out the first mask removal step, the second initial holes 212 may be formed in the mask formed in the first mask formation step in the second initial holes formation step. In this case, in the first etching step, the first recess portions are formed halfway, and in the second etching step, the first recess portions can be formed all the way while forming the second recess portions. Accordingly, the manufacturing step of the substrate with the recess portions for the microlenses is simplified.

Moreover, for example, at least once in the first initial holes formation step and/or the second initial holes formation step, a method other than the physical method and the laser beam irradiation described above (for example, method using photolithography technology, or the like) may be carried out.

Moreover, in the first etching step or the second etching step, the etching is carried out in a plurality of steps, and the shape of the formed first recess portions 24 or second recess portions 25 can be adjusted by changing the etching rate at this time. For example, by decreasing the etching rate gradually, the shapes of the formed plurality of first recess portions 24 and second recess portions 25 can be made the same and uniform.

Furthermore, by changing the size of the initial holes 221, and the size, the depth and the like of the initial recess portions 211, and further by changing the etching rate, the formed first recess portions 24 and second recess portions 25 can be made in an aspheric surface shape as desired.

In addition, in case that a series of steps described above are carried out repeatedly, the rear surface protection layer 23 may be removed in step <4>, or the like, and may be formed again in step <5>, instead of being used repeatedly after step <4>.

Accordingly, the substrate 2 with the recess portions for the microlenses in which a plurality of first recess portions 24 and the second recess portions 25, whose sizes differ to each other, are formed on the substrate 21, as shown in FIG. 7B and FIG. 8, is obtained. In addition, here, as shown in FIG. 8, the first recess portions 24 and the second recess portions 25 formed in the substrate 21 are arranged regularly, but not limited to this, and the first recess portions 24 and second recess portions 25 may be formed at random.

Moreover, the second recess portions 25 may be formed first in the first etching step, and the first recess portions 24 may then be formed in the second etching step. Namely, the recess portions formed in the first etching step may be made larger than the recess portions formed in the second etching step.

Moreover, between the first recess portions 24, third recess portions may be further formed on the substrate in addition to the second recess portions 25. Accordingly, because the area of the flat portion between the first recess portions is reduced further by the third recess portions, the microlens substrate manufactured by the obtained substrate with the recess portions for the microlenses will have an excellent view angle characteristic.

Moreover, the openings (the first and second initial holes 221 and 261) can be formed, in a predetermined pattern, in the mask 22 and the mask 26, more simply and inexpensively by forming the initial holes in the mask 22 and the mask 26 by a physical method or the laser beam irradiation. Accordingly, the productivity can be improved and the substrate 2 with the recess portions for the microlenses can be provided inexpensively. As a result, the productivity of the microlens substrate, the transmissive screen, the rear type projector and the like can also be improved, and further reduction of the production cost can be attained.

Moreover, according to the above described method, processing to a large-scale substrate can also be carried out easily. Namely, in case that the large-scale substrate is manufactured, it is not necessary to bond a plurality of substrates, and the bonding joints can be eliminated. Accordingly, a high quality large-scale substrate with the recess portions for the microlenses can also be manufactured by a simple method, inexpensively.

Method of Manufacturing Microlens Substrate 1

Hereinafter, a method of manufacturing the microlens substrate 1 will be described using the substrate 2 with the recess portions for the microlenses referring to FIG. 9.

In addition, not to mention that the microlens substrate of the present invention can be used for, for example, a liquid crystal display device (liquid crystal panel), an organic or an inorganic EL (Electro luminescence) display device, CCD, various kinds of electro-optic devices, such as an optical-communications element, other devices, and the like, in addition to the transmissive screen and the rear type projector, which will be described hereinafter.

The microlens substrate of the present invention can be manufactured, for example, by a 2P method (photopolymerization) or the like, which uses the substrate 2 with the recess portions for the microlenses manufactured as described above, as a mold.

Hereinafter, the method of manufacturing the microlens substrate 1 by the 2P method will be described, referring to FIG. 9.

<C1> First, as shown in FIG. 9A, the substrate 2 with the recess portions for the microlenses in which the first recess portions 24 and the second recess portions 25 for microlenses are formed is prepared. In this method, the substrate 2 with the recess portions for the microlenses in which this first recess portions 24 and the second recess portions 25 are formed is used as the mold. The microlenses 11 and 12 are formed by filling these recess portions 24 and 25 with resin. In addition a mold parting agent or the like may be applied to the inside of the first recess portions 24 and the second recess portions 25. Then, this substrate 2 with the recess portions for the microlenses is placed so that, for example, the first recess portions 24 and the second recess portions 25 may be opened (face) perpendicularly upwards.

<C2> Next, uncured resin, which will constitute a resin layer (microlens substrate 1) having the first microlenses 11 and the second microlenses 12 on the substrate 2 with the recess portions for the microlenses where the first recess portions 24 and the second recess portions 25 are formed, is provided.

<C3> Next, a substrate 3 is bonded to the resin, and is press-contacted.

As the substrate 3, one having a uniform thickness and which has no deformation and no defects is preferably used. As the material of the substrate 3, polyamide (for example, nylon 6, nylon 46, nylon 66, nylon 610, nylon 612, nylon 11, nylon 12, nylon 6-12, nylon 6-66), thermoplastic polyimide, liquid crystal polymers such as aromatic polyester, polyphenylene oxide, polyphenylene sulfide, polyethylene, polypropylene, polyolefin such as a ethylene-vinyl acetate copolymer, modified polyolefin, polycarbonate, acrylics (methacryl), poly-methyl methacrylate, polyethylene terephthalate, polyester such as polybutylene terephthalate, polyether, polyether-ether-ketone, polyether-imide, thermoplastic resin such as polyacetal, various kinds of epoxy resins such as bisphenol type, novolac type, and naphthalene system, phenol resin, urea resin, melamine resin, polyester (unsaturated polyester) resin, polyimide resin, silicon resin, thermosetting resin or the like such as polyurethane resin, a copolymer made of mainly these, a blend body, resin material or the like such as polymer alloy, glass, and the like are cited, however acrylics and polycarbonate are preferable among them. By using acrylics and polycarbonate as the substrate 2, the obtained microlens substrate 1 can be made with suitable optical characteristics. Moreover, acrylics and polycarbonate are relatively inexpensive and advantageous also in terms of the manufacturing cost.

<C4> Next, the resin is cured. This curing method is selected suitably depending on the type of resin, and for example, ultraviolet-rays irradiation, heating, electron beam irradiation and the like are cited.

Accordingly, as shown in FIG. 9B, a resin layer having the first microlenses 11 and the second microlenses 12, i.e., the microlens substrate 1 is formed. In this microlens substrate 1, the first microlenses 11 and the second microlenses 12 are formed by the resin which is filled in the first recess portions 24 and in the second recess portions 25.

<C5> Next, as shown in FIG. 9C, the substrate 2 with the recess portions for the microlenses and the substrate 3, which are the molds, are removed from the microlens substrate 1. In addition, instead of removing the substrate 3 from the microlens substrate 1, the bonded together microlens substrate 1 and the substrate 3 may form the microlens substrate.

Moreover, in the above description, microlens substrate 1 with plano-convex lenses (plano-convex microlenses) is provided where the microlenses are formed only in one surface, however, the microlens substrate of the present invention is not limited to this.

For example, a microlens substrate provided with a biconvex lens wherein the microlenses are formed in two surfaces may be made. In this case, the microlens substrate provided with a biconvex lens may be obtained by using two plano-convex lenses described above and bonding these to each other along the plane side. Moreover, the microlenses may be formed in both sides of one substrate.

Here, other embodiments of the microlens substrate will be described.

Other Embodiments of Microlens Substrate

As shown in FIG. 10A, between the first microlenses 11, third microlenses 14 may be further added on the substrate in addition to the second microlenses. Thereby, the area of the flat portion between the first microlenses 11 is reduced further by the third microlenses 14, therefore the obtained microlens substrate will have an excellent view angle characteristic.

Moreover, as shown in FIG. 10B, a plurality of first microlenses 11 may be arranged in a staggered shape. In this case, the plurality of first microlenses 11 are arranged more densely, and accordingly, the second microlenses 12' have a reduced diameter.

Furthermore, as shown in FIG. 11A, the first microlenses 11' may be in a straw bag shape, and the first microlenses 11' may be arranged in a grid shape, as shown in FIG. 11B.

Moreover, as shown in FIG. 12A, the first microlenses 11" may be in a shape lacking circular microlenses at both ends in the vertical direction, and the first microlenses 11" may be arranged in a grid shape, as shown in FIG. 12B.

Transmissive Screen

Figure 13:
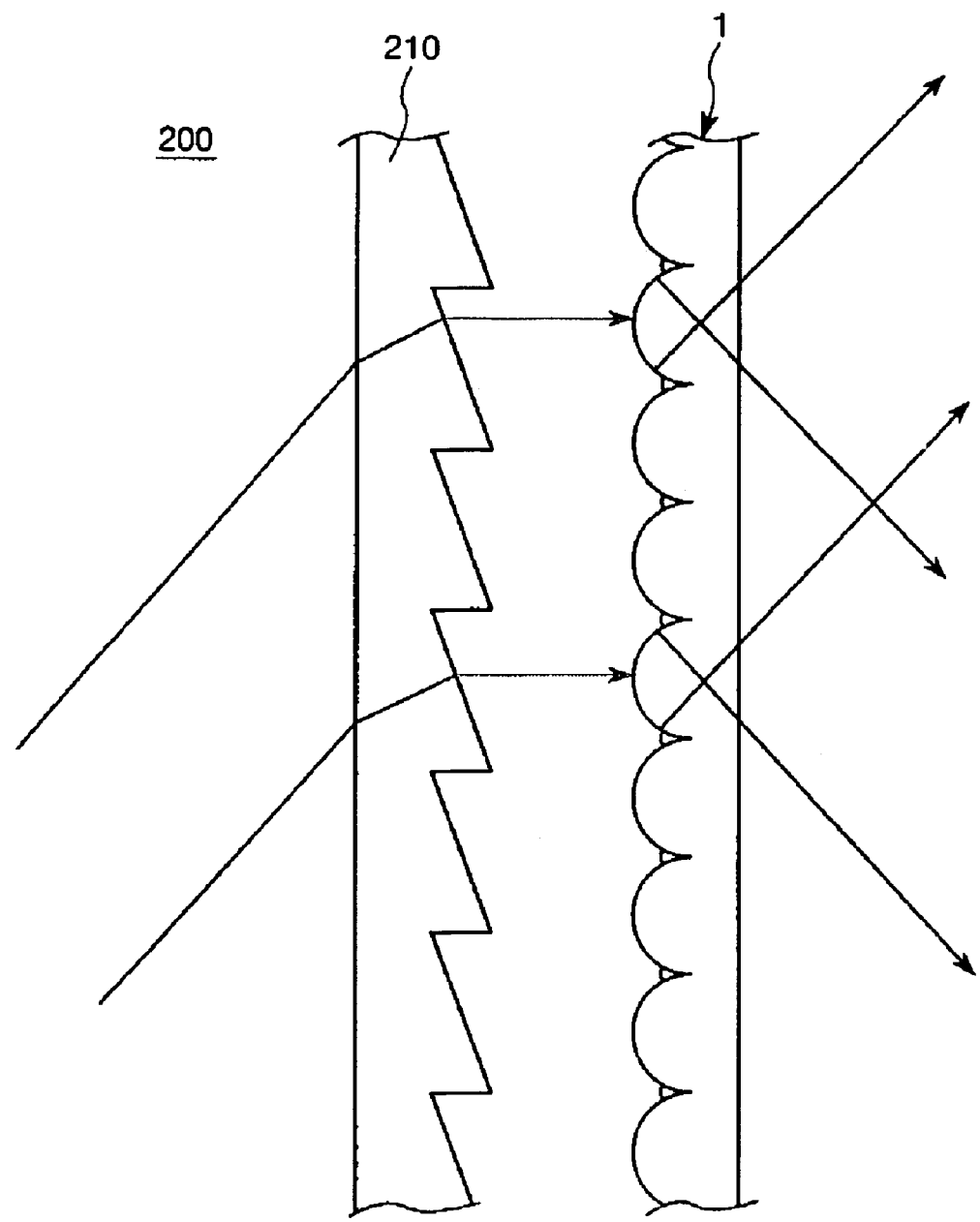
FIG. 13 is a schematic vertical cross sectional view showing an optical system of a transmissive screen of the present invention.
Figure 14:
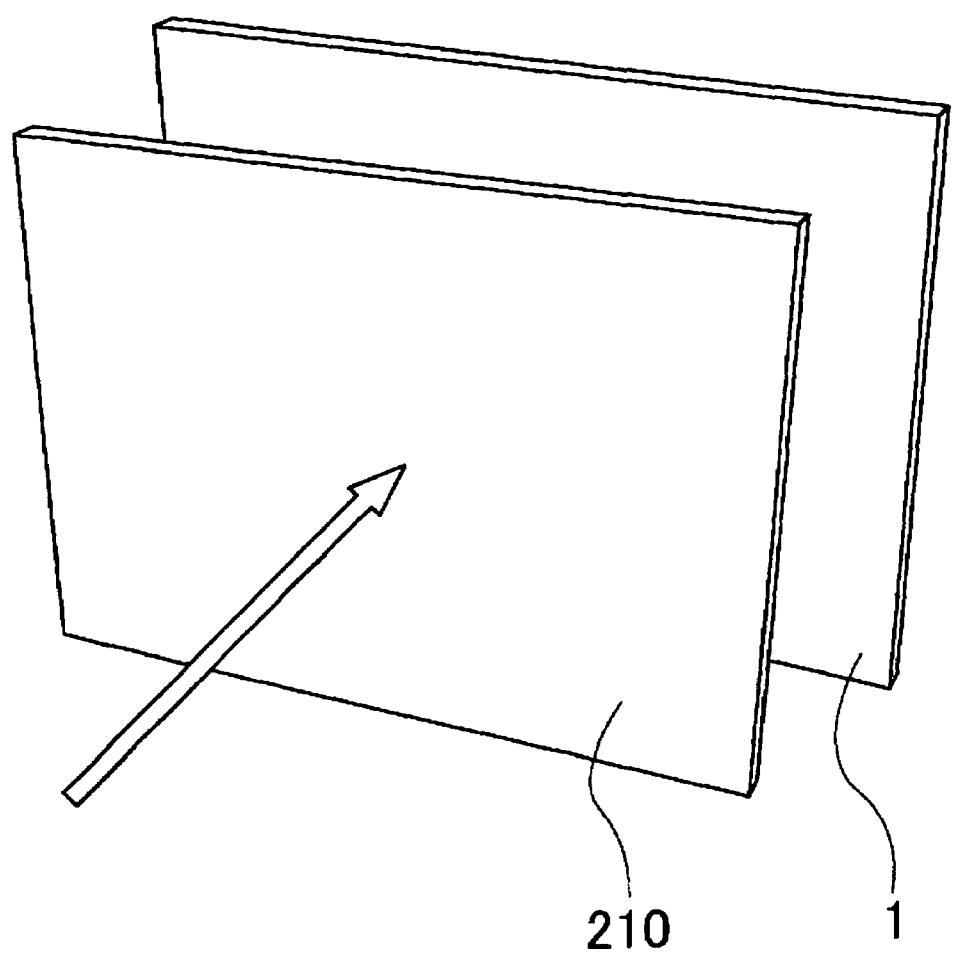
FIG. 14 is an exploded perspective view of the transmissive screen shown in FIG. 11.

Next, a transmissive screen using the microlens substrate 1 shown in FIG. 1 will be described, with reference to FIG. 13 and FIG. 14. FIG. 13 is a vertical cross sectional view showing schematically an optical system of a transmissive screen of the present invention, and FIG. 14 is an exploded perspective view of a transmissive screen shown in FIG. 13.

This transmissive screen 200 comprises: Fresnel lens portion 210 in which the Fresnel lens is formed in the surface of the outgoing surface side; and the microlens substrate 1 which is arranged at the outgoing surface side of the Fresnel lens portion 210 and in which a plurality of first microlenses 11 and second microlenses 12 are formed in the incident surface side.

Thus, the transmissive screen 200 has the microlens substrate 1. Accordingly, the view angle in the vertical direction becomes wide as compared with the case where a lenticular lens is used.

In particular, in case that as the microlens substrate 1, the one where the first microlenses 11 and the second microlenses 12 are arranged at random is used, the interference with a light valve and the Fresnel lens of a liquid crystal or the like, can be prevented more effectively, and the occurrence of moire can be eliminated nearly completely. Thereby, an excellent transmissive screen with an excellent display quality will be made.

Moreover, according to the above described method, a large-scale microlens substrate (microlens array portion) can be manufactured easily. Thereby, a high quality large-scale screen having no bonding joints can be manufactured.

In addition, the transmissive screen of the present invention is not limited to the above described configuration. For example, a transmissive screen, which further employs a black stripe, a light diffusion plate, and other microlenses at the outgoing surface side and at the incidence surface side of the microlens substrate (microlens array portion), may be made.

Rear Type Projector

Hereinafter, a rear type projector using the transmissive screen will be described.

Figure 15:
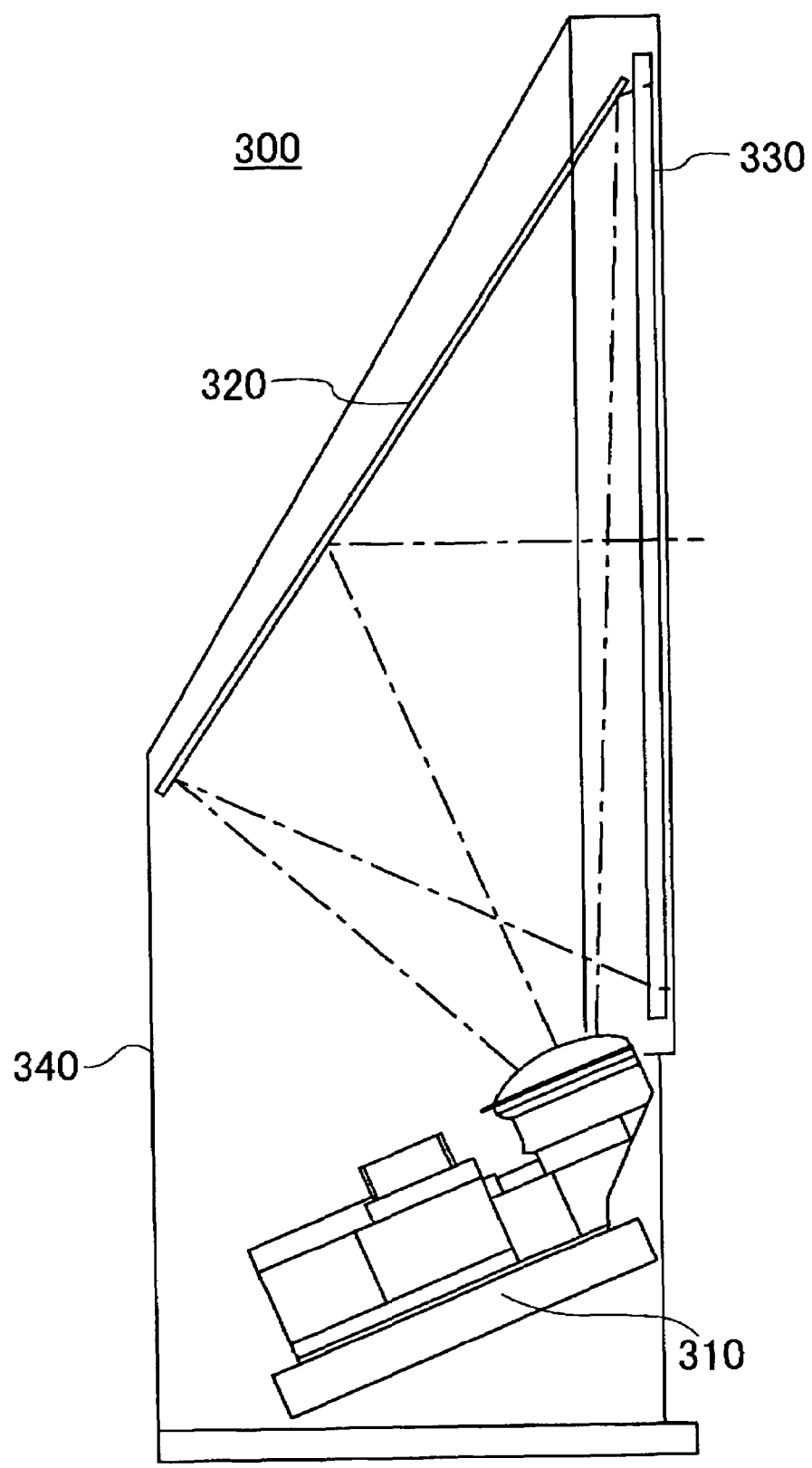
FIG. 15 is a view schematically showing the configuration of the rear type projector of the present invention.

FIG. 15 is a view schematically showing the configuration of a rear type projector of the present invention.

As shown in this view, a rear type projector 300 has a configuration in which a projection optical unit 310, a light guide mirror 320, and a transmissive screen 330 are arranged in a casing 340.

Then, in this rear type projector 300, as a transmissive screen 330, the transmissive screen 200, in which the above described diffracted light and moire will not occur easily, is used. For this reason, a rear type projector which has a wide view angle, no occurrence of moire, and an excellent display quality, will be made.

Furthermore, according to the method of the present invention, the processing to a large-scale substrate can also be carried out simply and suitably. Accordingly, for example, a high quality substrate with recess portions for large-scale microlenses, a microlens substrate, a transmissive screen, and a rear type projector can be manufactured by a simple method, inexpensively.

As described above, although the substrate with the recess portions for the microlenses and the manufacturing method thereof of the present invention, the microlens substrate, the transmissive screen, and the rear type projector of the present invention have been described based on the illustrated embodiments, the present invention is not limited to these.

For example, in the manufacturing method of the substrate with recess portions of the present invention, steps with arbitrary objectives can also be added as desired.

Moreover, in the above description, although in the manufacturing method of the substrate with the recess portions for the microlenses, a method of forming the initial holes in the mask which is formed on the surface of the substrate surface by a physical method or the laser beam irradiation, and then by forming the recess portions for lenses by carrying out etching is cited as an example, and has been described, the recess portions for the lenses may be formed by forming the opening portions or the like by carrying out etching by photolithography to the mask formed on the surface.

Moreover, in the above description, although in the initial holes formation step, a configuration in which the laser beam irradiation is carried out while displacing the laser 50 one-dimensionally, has been described, the laser beam irradiation may be carried out while displacing the laser two-dimensionally or three-dimensionally.

Moreover, in the above description, although a method of manufacturing the microlens substrate by the 2P method, the microlenses may be manufactured by methods other than the 2P method.

Moreover, in the earlier description, although as the first microlenses 11 and the second microlenses 12 which the microlens substrate 1 comprises, plano-convex type microlenses are cited as an example and have been described, this is not limiting, but biconvex type microlenses comprising two plano-convex type microlenses whose plane sides are opposed and bonded, may be used.

Moreover, the transmissive screen and the rear type projector of the present invention are not limited to the ones like the above-described embodiments, but each portion constituting the transmissive screen and the rear type projector can be replaced with an arbitrary configuration which can exhibit the same functions. For example, the transmissive screen of the present invention may be the transmissive screen further employing a black matrix (light-shielding portion), a light diffusion plate, and other microlenses in the outgoing surface side of the microlens substrate 1.

In addition, in the above description, although cases where the microlens substrate of the present invention is used for the transmissive screen and for the projection type display device provided with the transmissive screen are cited as examples and have been described, the present invention is not limited to this, but the microlens substrate of the present invention can be used for, for example, a CCD, various kinds of electro-optic devices such as an optical-communications element, a liquid crystal display device (liquid crystal panel), an organic or an inorganic EL (Electro luminescence) display device, other devices and the like.

Moreover, the display device is not limited to the rear projection type display device, but, for example, the microlens substrate of the present invention can be used for a front projection type display device.

EMBODIMENTS

Embodiment 1

The substrate with the recess portions for the microlenses comprising the recess portions for microlenses is manufactured, and the microlens substrate is manufactured using the substrate with the recess portions for the microlenses, as follows.

First, as the substrate, a non-alkali glass substrate with 1.2 m×0.7 m square and a thickness of 0.7 mm is prepared.

This non-alkali glass substrate is soaked in cleaning fluid (monohydric difuluoride ammonium solution of 4 wt %) at room temperature, to carry out cleaning, and the surface thereof is cleaned.

-1A- Next, on this non-alkali glass substrate, a Cr/Cr-oxide film (mask) with a thickness of 0.15 μm is formed by a sputtering method.

-2A- Next, a plurality of first initial holes are formed within the area of the center portion with 113 cm×65 cm of the mask by carrying out laser processing to the mask.

In addition, the laser processing is carried out using YAG laser with the energy intensity of 2 mW, the beam diameter of 5 μm, and the irradiation time of 0.1 ms.

Thereby, a plurality of first initial holes are formed in a grid shape all over the above described area of the mask. The average diameter of the first initial holes is 5 μm, and the formation density of the first initial holes is 20,000 pcs/cm².

Moreover, at this time, initial recess portions with a depth of 0.1 μm are also formed in the surface of the non-alkali glass substrate.

-3A- Next, a plurality of first recess portions are formed in the soda glass substrate by carrying out wet etching to the non-alkali glass substrate.

In addition, in the wet etching, a monohydric difluoride ammonium solution (at normal temperature) of 4 wt % is used as the etchant, and the soaking time is set to 12 hours.

-4A- Next, the non-alkali glass substrate is soaked in the mixed solution of cerium ammonium nitrate and perchloric acid for 30 minutes, and the Cr/Cr-oxide film (mask) is removed.

-5A- Next, the mask formation, the second initial holes formation, the wet etching, and the mask removal are carried out like the steps form -1A- through-4A-described above, except that the position of the second initial holes is set to the intermediate position of the first initial holes, and that the soaking time at the time of wet etching is set to 5 hours. Thereby, the second recess portions are formed between the first recess portions.

-6A- Next, the mask formation, the third initial holes formation, the wet etching, and the mask removal are carried out like the steps from -1A- through-4A-described above, except that the position of the third initial holes is set to the center position of the region except where the first initial holes and the second initial holes are formed on the non-alkali glass substrate, and that the soaking time at the time of wet etching is set to 2 hours. Thereby, the third recess portions are formed between the first recess portions and in the region except where the first recess portions and the second recess portions are formed.

Thereby, a wafer-shaped substrate with the recess portions for the microlenses, in which a plurality of recess portions for the first microlenses and for the second microlenses are formed regularly on the non-alkali glass substrate, is obtained.

The microlens substrate is manufactured by the 2P method using the substrate with the recess portions for the microlenses manufactured as described above.

-7A- The substrate with the recess portions for the microlenses is placed so that the recess portions may be opened (face) perpendicularly upwards, and while supplying uncured epoxy resin, the glass substrate is bonded on the resin and press-adhered.

-8A- Next, the resin is cured. Thereby, the microlenses are formed by the resin that is filled in the recess portions.

-9A- Next, the substrate with the recess portions for the microlenses, which is a mold, is removed from the microlens substrate, and the microlens substrate is obtained.

Thereby, as shown in FIG. 10A, a microlens substrate of 1.2 m×0.7 m, in which the plurality of first microlenses and the second microlenses whose sizes differ are formed regularly, is obtained. The diameter of the formed first microlenses is 110 μm, the diameter of the second microlenses is 50 μm, and the diameter of the third microlenses is 15 μm. Moreover, the height of the first microlenses is 55 μm (=curvature radius), the height of the second microlenses is 25 μm (=curvature radius), and the diameter of the third microlenses is 7.5 μm (=curvature radius). Furthermore, the optical concentration to 587.56 nm light for each of the first microlenses, the second microlenses, and the third microlenses is 0.2.

Embodiment 2

The same substrate with the recess portions for the microlenses as the above-described embodiment 1 is obtained by the same method as embodiment 1, except that the position of a plurality of first recess portions are made in a staggered-shape, that the size of the second recess portions is made smaller than the above-described embodiment 1, and that the third recess portions are not formed.

The microlens substrate is obtained by the same method as embodiment 1 using this substrate with the recess portions for the microlenses. Thereby, as shown in FIG. 10B, except that the position of a plurality of first microlenses are made staggered-shaped, that the size of the second microlenses is made smaller than the above-described embodiment 1, and that the third microlenses are not formed, the same microlens substrate as the above-described embodiment 1.

The obtained diameter of the second microlenses is 20 μm (=curvature radius). Moreover, the height of the second microlenses is 10 μm (=curvature radius).

Embodiment 3

Except that the periphery shape of the first recess portions is made a straw bag shape, and that the third recess portions are not formed, the same substrate with the recess portions for the microlenses as the above-described embodiment 1 is obtained by the same method as embodiment 1. In this case, the first initial holes are made long holes extending by 50 μm upwards and downwards (in opposite directions).

The microlens substrate is obtained by the same method as embodiment 1 using this substrate with the recess portions for the microlenses. Thereby, as shown in FIG. 11A, except that the shape of the first microlenses is a straw bag shape, and that the third microlenses are not formed, the same microlens substrate as the above-described embodiment 1, is obtained.

The length in the long axis direction of the formed first microlenses is 150 μm, and the length in the short axis direction of the first microlenses is 110 μm.

Embodiment 4

Except that the periphery shape of the first recess portions is made a straw bag shape, the same substrate with the recess portions for the microlenses as the above-described embodiment 2 is obtained by the same method as embodiment 1. In this case, the first initial holes are made long holes extending by 50 μm upwards and downwards.

The microlens substrate is obtained by the same method as embodiment 1 using this substrate with the recess portions for the microlenses. Thereby, as shown in FIG. 11B, except that the shape of the first microlenses is made a straw bag shape, the same microlens substrate as the above-described embodiment 2 is obtained.

The obtained diameter of the second microlenses is 20 μm. Moreover, the height of the second microlenses is 10 μm (=curvature radius).

Embodiment 5

Except that the distance, in the vertical direction, between the first recess portions is made smaller than the above-described embodiment 1, and thereby the shape of the first recess portions becomes the shape lacking, at both ends in the vertical direction, the circular recess portions with a diameter of 110 μm, that the shape of the second recess portions is made smaller than the first embodiment, and that the third recess portions are formed only in the upper and lower portions of the second recess portions, the same substrate with the recess portions for the microlenses as the above-described embodiment 1 is obtained by the same method as embodiment 1.

The microlens substrate is obtained by the same method as embodiment 1 using this substrate with the recess portions for the microlenses. Thereby, as shown in FIG. 12A, except that the distance in the vertical direction between the first microlenses is made smaller than the above-described embodiment 1, and thereby the shape of the first microlenses becomes the shape lacking, at both ends in the vertical direction, the circular microlenses with a diameter of 110 μm, that the size of the second microlenses is made smaller than the first embodiment, and that the third microlenses are formed only in the upper and lower portions of the second microlenses, the same microlens substrate as the above-described embodiment 1 is obtained.

The length in the vertical direction of the formed first microlenses is 80 μm, the diameter of the second microlenses is 25 μm, and the diameter of the third microlenses is 10 μm. Moreover, the height of the second microlenses is 12.5 μm (=curvature radius), and the height of the third microlenses is 5 μm (=curvature radius).

Embodiment 6

Except that the position of the first recess portions is in a staggered shape, that the size of the second recess portions is made smaller than the above-described embodiment 5, and that the third recess portions are not formed, the same substrate with the recess portions for the microlenses as the above-described embodiment 5 is obtained by the same method as embodiment 1.

The microlens substrate is obtained by the same method as embodiment 1 using this substrate with the recess portions for the microlenses. Thereby, as shown in FIG. 12B, except that the position of the first microlenses is in a staggered shape, that the size of the second microlenses is made smaller than the above-described embodiment 5, and that the third microlenses are not formed, the same microlens substrate as the above-described embodiment 5 is obtained.

The diameter of the obtained second microlenses of the microlens substrate is 8 μm. Moreover, the height of the second microlenses is 4 μm (=curvature radius).

Embodiment 7

Except that the mask is made of a Ni/Ni-oxide film, that not only the first initial holes but the openings (recess portions shape) for the second recess portions formation are formed more shallow than the first initial holes (depth of 0.1 μm) in step-2A-, and that the first recess portions and the second recess portions are formed on the non-alkali glass substrate only in step-3A- without carrying out steps-4A- and -5A-, the substrate with the recess portions for the microlenses is obtained by the same method as the above-described embodiment 1.

Then, the microlens substrate is obtained by the same method as the above-described embodiment 1 using this substrate with the recess portions for the microlenses.

COMPARATIVE EXAMPLE 1

Except that the second microlenses and the third microlenses are not formed, the same microlens substrate as embodiment 1 is obtained by the same method as embodiment 1.

COMPARATIVE EXAMPLE 2

Except that a plurality of microlenses are arranged in a honeycomb shape so as to overlap the microlenses, the same microlenses as embodiment 1 are obtained. In this case, a flat portion does not exist at all between the microlenses, and the microlenses are making a hexagonal shape like the one with the periphery portion of the circular microlenses being chopped.

The length in the diagonal direction of the microlenses of the obtained microlens substrate is 110 μm.

Evaluation

Figure 10:
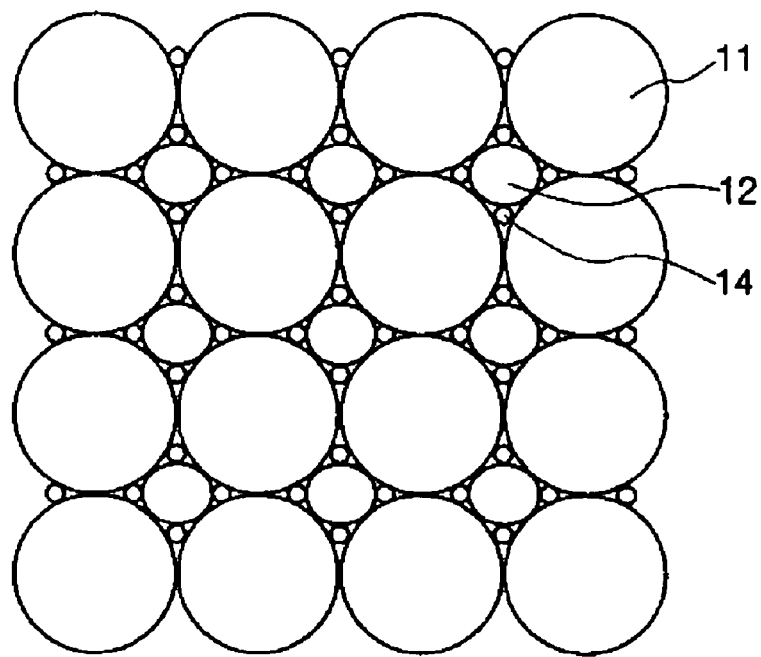
FIG. 10A is an schematic plan view showing the microlens substrate related to one embodiment of the present invention.
FIG. 10B is a schematic plan view showing the microlens substrate related to another embodiment of the present invention.
Figure 10:
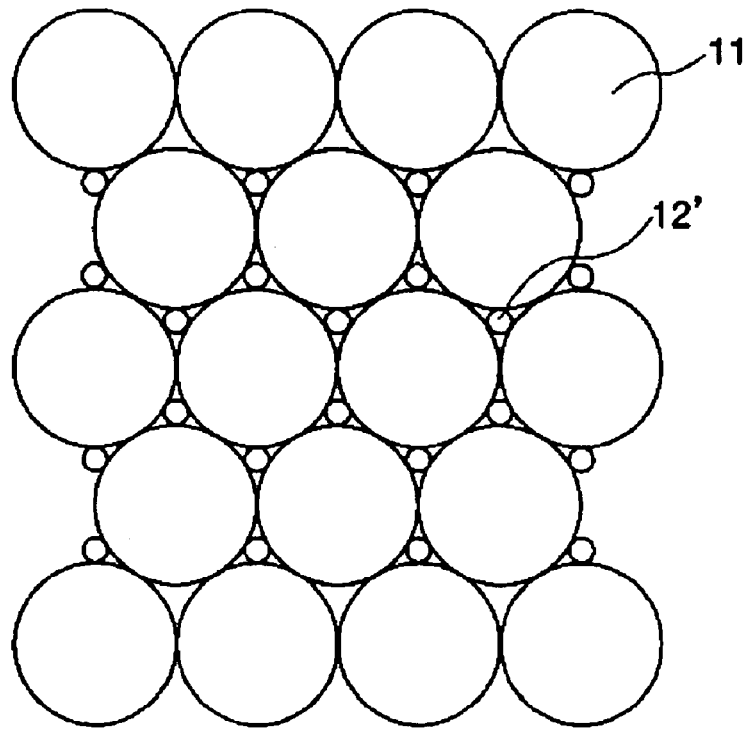
Figure 12:
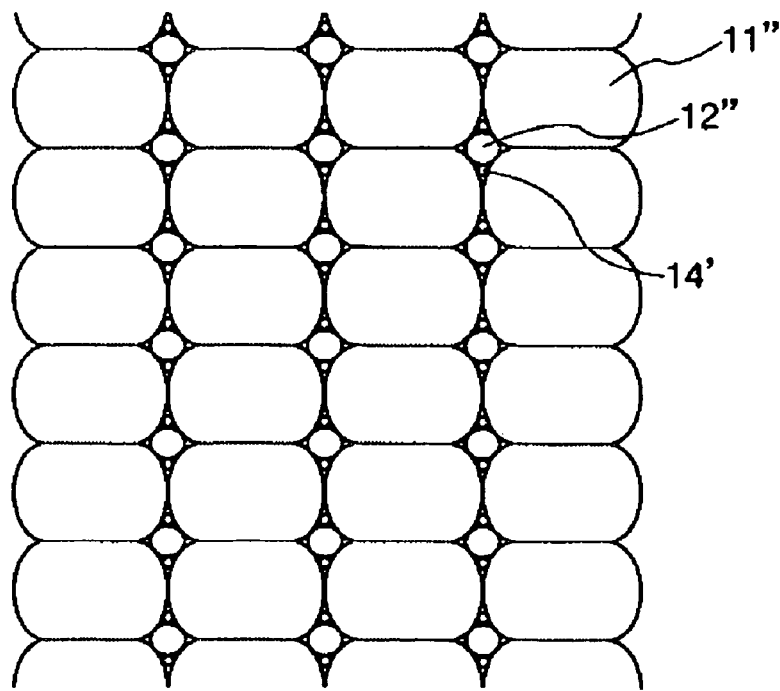
FIG. 12A is a schematic plan view showing the microlens substrate related to one embodiment of the present invention.
FIG. 12B is a schematic plan view showing the microlens substrate related to yet another embodiment of the present invention.
Figure 12:
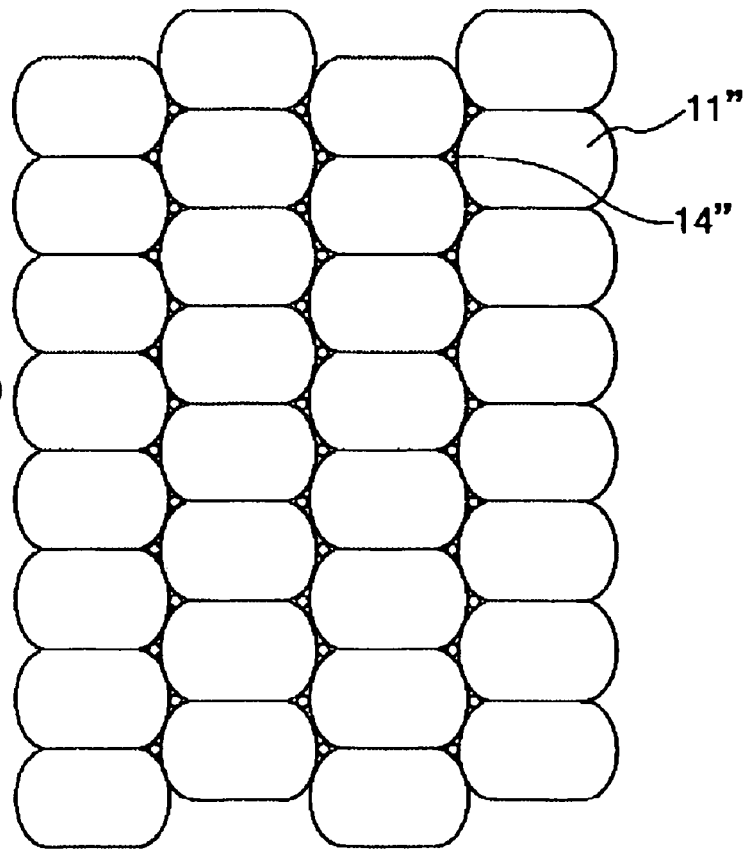

By using the microlens substrate obtained by the above embodiments and comparative examples, the transmissive screen like the one shown in FIG. 10 and FIG. 11 is manufactured, and the rear type projector like the one shown in FIG. 12 is manufactured using the screen.

With a sample picture being displayed on the transmissive screen of the obtained rear type projector, the view angle in the horizontal direction (an angle (α angle) where the luminous intensity becomes a half, and an angle (β angle) where the luminous intensity becomes one third) is measured using a goniophotometer.

The result is shown in Table 1.

On the other hand, the rear type projector provided with the transmissive screen obtained in the comparative examples, has a large difference in light quantity, and an inferior view angle characteristic.

What is claimed is:

1. A substrate with a plurality of recess portions for forming microlenses, comprising:
    a plurality of first recess portions on a first surface of the substrate; and
    a plurality of second recess portions on the first surface of the substrate that are located between the plurality of first recess portions, the second recess portions being smaller than the first recess portions,
    wherein the first recess portions are adjoined and each have a periphery in contact with the peripheries of the adjacent first recess portions thereby defining a plurality of spaces therebetween and the second recess portions are formed in the spaces.

2. The substrate with the recess portions for the microlenses according to claim 1, wherein the plurality of first recess portions are arranged in substantially a grid shape.

3. The substrate with the recess portions for the microlenses according to claim 1, wherein the plurality of first recess portions are arranged in substantially a staggered shape.

4. The substrate with the recess portions for the microlenses according to claim 1, wherein a periphery of each first recess portion and a periphery of each second recess portion are located on a common planar surface of the substrate.

5. The substrate with the recess portions for the microlenses according to claim 1, wherein each of the first recess portions and the second recess portions is substantially circular.

6. The substrate with the recess portions for the microlenses according to claim 1, wherein the second recess portions are arranged to substantially eliminate a flat portion between the first recess portions.

TABLE 1

| | Emb. 1 | Emb. 2 | Emb. 3 | Emb. 4 | Emb. 5 | Emb. 6 | Emb. 7 | Comp. ex. 1 | Comp. ex. 2 |
|---|---|---|---|---|---|---|---|---|---|
| α angle (angle where luminous intensity becomes a half) | 22° | 20° | 22° | 21° | 23° | 25° | 22° | 10° | 15° |
| β angle (angle where luminous intensity becomes one third) | 30° | 27° | 26° | 26° | 28° | 32° | 29° | 20° | 22° |

As a result, it is confirmed that the rear type projector provided with the transmissive screen obtained in each embodiment has both an α angle and a β angle wider as compared with the rear type projector provided with the transmissive screen obtained in the comparative examples, and has an excellent view angle characteristic. Moreover, in the rear type projector obtained in each embodiment, bright pictures are displayed at each view angle.

7. The substrate with the recess portions for the microlenses according to claim 1, wherein a periphery of each first recess portion contacts a periphery of at least one of the second recess portions.

8. The substrate with the recess portions for the microlenses according to claim 1, further comprising third recess portions that are smaller than the second recess portions, wherein the third recess portions are located between the first recess portions in regions free from the second recess portions.

9. A microlens substrate manufactured using the substrate with the recess portions for the microlenses according to claim 1.

10. A microlens substrate in which a plurality of microlenses are formed on a substrate, comprising:

a plurality of first microlenses; and a plurality of second microlenses that are located between the first microlenses, the second microlenses being smaller than the first microlenses;

wherein the plurality of first microlenses are adjoined and each have a periphery in contact with the peripheries of the adjacent first microlenses thereby defining a plurality of spaces therebetween and the plurality of second microlenses are formed in the spaces;

wherein the second microlenses are arranged to substantially eliminate a flat portion between the first microlenses.

11. A transmissive screen provided with the microlens substrate according to claim 10.

12. A rear type projector provided with the microlens substrate according to claim 10.

* * * * *